United States Patent
Ujikawa et al.

(10) Patent No.: US 12,040,831 B2
(45) Date of Patent: Jul. 16, 2024

(54) OPTICAL COMMUNICATION SYSTEM AND MASTER STATION

(71) Applicant: NIPPON TELEGRAPH AND TELEPHONE CORPORATION, Tokyo (JP)

(72) Inventors: Hirotaka Ujikawa, Musashino (JP); Rintaro Harada, Musashino (JP); Shin Kaneko, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 95 days.

(21) Appl. No.: 17/917,597

(22) PCT Filed: Apr. 14, 2020

(86) PCT No.: PCT/JP2020/016476
§ 371 (c)(1),
(2) Date: Oct. 7, 2022

(87) PCT Pub. No.: WO2021/210078
PCT Pub. Date: Oct. 21, 2021

(65) Prior Publication Data
US 2023/0142562 A1 May 11, 2023

(51) Int. Cl.
*H04B 10/03* (2013.01)
*H04B 10/032* (2013.01)
(Continued)

(52) U.S. Cl.
CPC ....... *H04B 10/032* (2013.01); *H04B 10/2755* (2013.01); *H04L 43/0864* (2013.01);
(Continued)

(58) Field of Classification Search
CPC .. H04B 10/032; H04B 10/2755; H04B 10/03; H04B 10/275; H04L 43/0864;
(Continued)

(56) References Cited

U.S. PATENT DOCUMENTS 6,351,582 B1 * 2/2002 Dyke ............... H04B 10/272
  385/24
6,414,768 B1 * 7/2002 Sakata ............... H04B 10/27
  398/59

(Continued)

OTHER PUBLICATIONS

Rintaro Harada et al., Cyclic Wavelength Allocation Scheme Reducing the Number of Wavelengths in Bus-Topology WDM Access Systems, 2020 IEICE General Conference, Mar. 17, 2020, p. 159.

(Continued)

*Primary Examiner* — Dibson J Sanchez
(74) *Attorney, Agent, or Firm* — Harness, Dickey & Pierce, P.L.C.

(57) ABSTRACT

The present invention enables shortening the time required for resuming communication in a protection method that uses a backup path in an optical communication system that includes a master station device and multiple slave station devices. The slave station devices are connected to a loop path in parallel. The communication paths between the master station device and the slave station devices include a normal path and a backup path. First and second slave station devices are slave station devices that cannot perform communication via the normal path. The magnitude relationship between backup path RTTs is opposite to the magnitude relationship between normal path RTTs. If the second normal path RTT for the second slave station device is longer than the first normal path RTT for the first slave station device, the first backup path RTT is longer than the second backup path RTT, and the second backup path RTT is shorter than the first backup path RTT. Based on this fact, (Continued)

the master station device limits the QuietWindow, which is used in ranging processing for measuring the backup path RTT, to a size smaller than a predetermined maximum size.

8 Claims, 15 Drawing Sheets

(51) Int. Cl.
  *H04B 10/275* (2013.01)
  *H04L 43/0864* (2022.01)
  *H04J 14/02* (2006.01)
  *H04Q 11/00* (2006.01)

(52) U.S. Cl.
  CPC ............ *H04B 10/03* (2013.01); *H04B 10/275* (2013.01); *H04J 14/0287* (2013.01); *H04Q 11/0062* (2013.01); *H04Q 11/0067* (2013.01); *H04Q 2011/0079* (2013.01); *H04Q 2011/0081* (2013.01); *H04Q 2011/0092* (2013.01)

(58) Field of Classification Search
  CPC ............ H04J 14/0287; H04Q 11/0062; H04Q 11/0067; H04Q 2011/0079; H04Q 2011/0081; H04Q 2011/0092; H04Q 2011/0086; H04Q 11/00
  USPC .............................................. 398/1–8, 43–103
  See application file for complete search history.

(56) References Cited

U.S. PATENT DOCUMENTS

| | | | | | |
|---|---|---|---|---|---|
| 7,272,321 | B1* | 9/2007 | Kuo | ............... | H04J 14/0241 398/100 |
| 7,406,029 | B1* | 7/2008 | Ciancaglini | ......... | H04J 14/0227 370/242 |
| 9,008,501 | B2* | 4/2015 | Lutgen | ............... | H04B 10/032 398/4 |
| 11,272,272 | B2* | 3/2022 | Zhang | ............... | H04Q 11/0067 |
| 2002/0071149 | A1* | 6/2002 | Xu | ............... | H04B 10/032 370/216 |
| 2005/0019031 | A1* | 1/2005 | Ye | ............... | H04B 10/077 398/19 |
| 2005/0031348 | A1* | 2/2005 | Choi | ............... | H04Q 11/0067 398/59 |
| 2006/0083513 | A1* | 4/2006 | Huang | ............... | H04J 14/0297 398/83 |
| 2008/0131124 | A1* | 6/2008 | Nam | ............... | H04B 10/272 398/67 |
| 2008/0267628 | A1* | 10/2008 | Li | ............... | H04B 10/2755 398/79 |
| 2009/0074403 | A1* | 3/2009 | Chi | ............... | H04B 10/275 398/3 |
| 2010/0046941 | A1* | 2/2010 | Stadler | ............... | H04J 3/1694 398/58 |
| 2010/0054739 | A1* | 3/2010 | Lavillonniere | ..... | H04J 14/0282 398/67 |
| 2010/0166419 | A1* | 7/2010 | Elmoalem | ......... | H04Q 11/0067 398/35 |
| 2010/0310252 | A1* | 12/2010 | Healey | ............... | H04J 3/1694 398/6 |
| 2011/0317998 | A1* | 12/2011 | Fujimura | ............... | H04L 47/10 398/25 |
| 2012/0082449 | A1* | 4/2012 | Zheng | ............... | H04J 14/0283 398/25 |
| 2012/0114333 | A1* | 5/2012 | Zhang | ............... | H04Q 11/0067 398/58 |
| 2013/0272699 | A1* | 10/2013 | Liang | ............... | H04B 10/071 398/45 |
| 2015/0244454 | A1* | 8/2015 | Kim | ............... | H04B 10/032 398/2 |
| 2016/0087748 | A1* | 3/2016 | Khotimsky | ........... | H04J 14/025 398/67 |
| 2016/0105240 | A1* | 4/2016 | Yang | ............... | G02B 6/2938 398/68 |
| 2016/0112136 | A1* | 4/2016 | Urban | ............... | G02B 6/2934 398/66 |
| 2018/0248797 | A1* | 8/2018 | Kim | ............... | H04L 12/42 |
| 2019/0014398 | A1* | 1/2019 | Zhang | ............... | H04Q 11/0067 |
| 2021/0352387 | A1* | 11/2021 | Geng | ............... | H04Q 11/0005 |

OTHER PUBLICATIONS

Hirotaka Ujikawa et al., Protection Architecture for Reliable Bus-topology WDM Access Systems, 2020 IEICE General Conference, Mar. 17, 2020, p. 161.

* cited by examiner

OPTICAL COMMUNICATION SYSTEM AND MASTER STATION

CROSS-REFERENCE TO RELATED APPLICATIONS

This application is a 371 U.S. National Phase of International Application No. PCT/JP2020/016476, filed on Apr. 14, 2020. The entire disclosure of the above application is incorporated herein by reference.

TECHNICAL FIELD

The present invention relates to an optical communication system and a master station device in the optical communication system.

BACKGROUND ART

A PON (Passive Optical Network) system is known as an optical communication system. In recent years, a TWDM-PON (Time and Wavelength Division Multiplexing-PON) system that uses WDM (Wavelength Division Multiplexing) technology has also been proposed.

NPL 1 discloses a bus-topology WDM Access System as an example of a TWDM-PON system. The network topology of an OLT (Optical Line Termination, or Optical Line Terminal) and ONUs (Optical Network Units) is a bus topology. Such a bus-topology WDM access system is applied to a MFH (Mobile Fronthaul) when deploying a mobile communication area linearly, for example.

NPL 2 discloses a protection method for improving reliability in a bus-topology WDM access system. In the case of a bus topology, if the trunk fiber becomes disconnected, communication may be cut off for many ONUs. In view of this, a loop-shaped communication path is formed by combining the main trunk fiber with a backup trunk fiber. In a normal situation where no disconnection has occurred, the backup path is cut off by an optical switch, and communication between the OLT and ONUs is performed only via the normal path. If a disconnection occurs in a portion of the normal path, the backup path is enabled in addition to the normal path. The OLT then uses the backup path to perform communication with disconnected ONUs that cannot perform communication via the normal path. This makes it possible to resume communication with all disconnected ONUs without waiting for repair of the optical fiber that constitutes the normal path.

CITATION LIST

Non Patent Literature

[NPL 1] Harada et al., "Cyclic Wavelength Allocation Scheme Reducing the Number of Wavelengths in Bus-Topology WDM Access Systems," IEICE (Institute of Electronics, Information and Communication Engineers) 2020, B-8-12, p. 159, March 2020.

[NPL 2] Ujikawa et al., "Protection Architecture for Reliable Bus-topology WDM Access Systems," IEICE (Institute of Electronics, Information and Communication Engineers) 2020, B-8-14, p. 161, March 2020.

SUMMARY OF THE INVENTION

Technical Problem

In an optical communication system that includes a master station device and multiple slave station devices, the master station device executes communication control processing for controlling communication with each of the slave station devices. Consider the case where this communication control processing is executed based on the "RTT" (Round Trip Time) between the master station device and each of the slave station devices. In the case of executing communication control processing based on RTT, the master station device needs to be aware of the RTT for all of the slave station devices.

For example, in a PON system, uplink communication from multiple slave station devices (ONU) to a master station device (OLT) is performed using TDMA (Time Division Multiple Access). In order to prevent uplink optical signals transmitted from the ONUS from colliding with each other, the OLT controls the transmission timing of the uplink optical signal from each ONU based on the corresponding RTT for that ONU. To achieve this, the OLT needs to be aware of the RTT for all of the communication partner ONUS in advance. In view of this, when the OLT executes registration processing (discovery) for registering an ONU, the OLT executes "ranging processing" for measuring the RTT for that ONU.

Here, consider a protection method that uses a backup path as disclosed in NPL 2 described above. As described above, the OLT uses the backup path instead of the normal path to perform communication with disconnected ONUS that cannot perform communication via the normal path. In order to achieve this, it is necessary to execute ranging processing for all of the disconnected ONUs and measure the new RTT in the case of performing communication via the backup path. This contributes to an increase in the time required to resume communication.

One object of the present invention is to provide a technique for making it possible to shorten the time required for resuming communication in a protection method that uses a backup path in an optical communication system that includes a master station device and multiple slave station devices.

Solution to Problem

A first aspect of the present invention relates to an optical communication system.

The optical communication system includes:
a plurality of slave station devices that are connected to a loop path in parallel; and
a master station device that is connected to the loop path and configured to perform communication with each of the slave station devices.

Communication paths between the master station device and each of the slave station devices include:
  a normal path that extends along the loop path from the master station device to each of the slave station devices in a first direction, and
  a backup path that extends along the loop path from the master station device to each of the slave station devices in a second direction that is opposite to the first direction.

The master station device is configured to execute:
  ranging processing for setting a QuietWindow and measuring an RTT (Round Trip Time) between the master station device and each of the slave station devices, and communication control processing for controlling communication with the slave station devices based on the RTTs.

A normal path RTT is the RTT in a case of communication performed via the normal path.

A backup path RTT is the RTT in a case of communication performed via the backup path.

A disconnected slave station device is a slave station device that cannot perform communication via the normal path, among the plurality of slave station devices.

If the disconnected slave station device does not exist, the master station device executes the communication control processing with respect to the slave station devices based on the normal path RTTs.

If the disconnected slave station device is detected, the master station device executes the ranging processing and measures the backup path RTT for the disconnected slave station device, and resumes the communication control processing with respect to the disconnected slave station device based on the backup path RTT.

A first slave station device is a disconnected slave station device having a first normal path RTT as the normal path RTT.

A second slave station device is a disconnected slave station device having a second normal path RTT as the normal path RTT, the second normal path RTT being longer than the first normal path RTT.

A first backup path RTT is the backup path RTT between the master station device and the first slave station device.

A second backup path RTT is the backup path RTT between the master station device and the second slave station device.

In the ranging processing for measuring the backup path RTT, based on a fact that the first backup path RTT is longer than the second backup path RTT, and that the second backup path RTT is shorter than the first backup path RTT, the master station device limits the QuietWindow to a size smaller than a predetermined maximum size.

A second aspect of the present invention relates to a master station device that performs communication with each of a plurality of slave station devices in an optical communication system.

The slave station devices are connected to a loop path in parallel.

Communication paths between the master station device and each of the slave station devices include:
   a normal path that extends along the loop path from the master station device to each of the slave station devices in a first direction, and
   a backup path that extends along the loop path from the master station device to each of the slave station devices in a second direction that is opposite to the first direction.

The master station device is configured to execute:
   ranging processing for setting a QuietWindow and measuring an RTT (Round Trip Time) between the master station device and each of the slave station devices, and
   communication control processing for controlling communication with the slave station devices based on the RTTs.

A normal path RTT is the RTT in a case of communication performed via the normal path.

A backup path RTT is the RTT in a case of communication performed via the backup path.

A disconnected slave station device is a slave station device that cannot perform communication via the normal path, among the plurality of slave station devices.

If the disconnected slave station device does not exist, the master station device executes the communication control processing with respect to the slave station devices based on the normal path RTTs.

If the disconnected slave station device is detected, the master station device executes the ranging processing and measures the backup path RTT for the disconnected slave station device, and resumes the communication control processing with respect to the disconnected slave station device based on the backup path RTT.

A first slave station device is a disconnected slave station device having a first normal path RTT as the normal path RTT.

A second slave station device is a disconnected slave station device having a second normal path RTT as the normal path RTT, the second normal path RTT being longer than the first normal path RTT.

A first backup path RTT is the backup path RTT between the master station device and the first slave station device.

A second backup path RTT is the backup path RTT between the master station device and the second slave station device.

In the ranging processing for measuring the backup path RTT, based on a fact that the first backup path RTT is longer than the second backup path RTT, and that the second backup path RTT is shorter than the first backup path RTT, the master station device limits the QuietWindow to a size smaller than a predetermined maximum size.

Advantageous Effects of Invention

According to the present invention, the slave station devices are connected to the loop path in parallel. Accordingly, the magnitude relationship between the backup path RTTs is opposite to the magnitude relationship between the normal path RTTs. If the second normal path RTT for the second slave station device is longer than the first normal path RTT for the first slave station device, the first backup path RTT is longer than the second backup path RTT, and the second backup path RTT is shorter than the first backup path RTT. Based on this fact, the master station device limits the size of the QuietWindow, which is used in ranging processing for measuring the backup path RTT, to a size smaller than a predetermined maximum size. Due to reducing the size of the QuietWindow, the time required for ranging processing for measuring the backup path RTT is shortened. As a result, the time required to resume communication is shortened. Also, suspension and uplink delay in uplink communication caused by the ranging processing are suppressed.

DESCRIPTION OF EMBODIMENTS

An embodiment of the present invention is described below with reference to the accompanying drawings.

1. OVERVIEW 1-1. Basic Configuration

Figure 1:
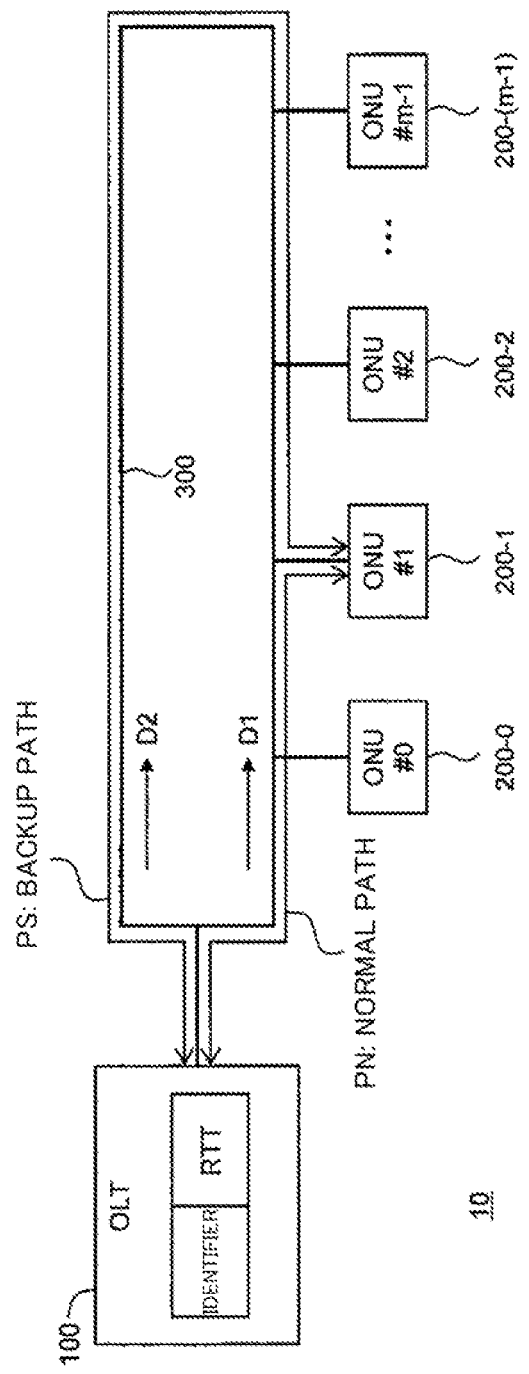
FIG. 1 is a conceptual diagram schematically showing a configuration of an optical communication system according to an embodiment of the present invention.

FIG. 1 schematically shows the configuration of an optical communication system 10 according to the present embodiment. The optical communication system 10 includes a master station device 100 and multiple slave station devices 200. In the example shown in FIG. 1, the optical communication system 10 includes m slave station devices 200-$i$ (i=0 to m−1). Here, m is an integer greater than or equal to 2. The master station device 100 is connected to the slave station devices 200 via an optical fiber and performs optical communication with each of the slave station devices 200.

In the following description, the optical communication system 10 is a PON (Passive Optical Network) system. The master station device 100 is hereinafter referred to as an "OLT (Optical Line Termination, or Optical Line Terminal) 100". The slave station devices 200 are hereinafter referred to as "ONUs (Optical Network Units) 200".

In the present embodiment, the network topology of the OLT 100 and the ONUs 200 is a bus topology. More specifically, as shown in FIG. 1, the optical communication system 10 includes a loop path 300 that is formed by a trunk fiber arranged in a loop. The OLT 100 is connected to the loop path 300. The ONUs 200 are connected to the loop path 300 in parallel.

Due to the inclusion of the loop path 300, two types of communication paths exist between the OLT 100 and each of the ONUs 200, namely a normal path PN and a backup path PS. For example, when considering the downlink direction from the OLT 100 to each of the ONUs 200, the normal path PN is a communication path that extends in a first direction D1 along the loop path 300. On the other hand, the backup path PS is a communication path that extends in a second direction D2, which is opposite to the first direction D1, along the loop path 300. FIG. 1 shows the normal path PN and the backup path PS for the ONU 200-1 as one example.

Note that the distance between the OLT 100 and each of the ONUs 200 is within a maximum accommodating distance regardless of whether the normal path PN or the backup path PS is used. The maximum accommodating distance is 20 km, for example.

1-2. Normal Operation

Figure 2:
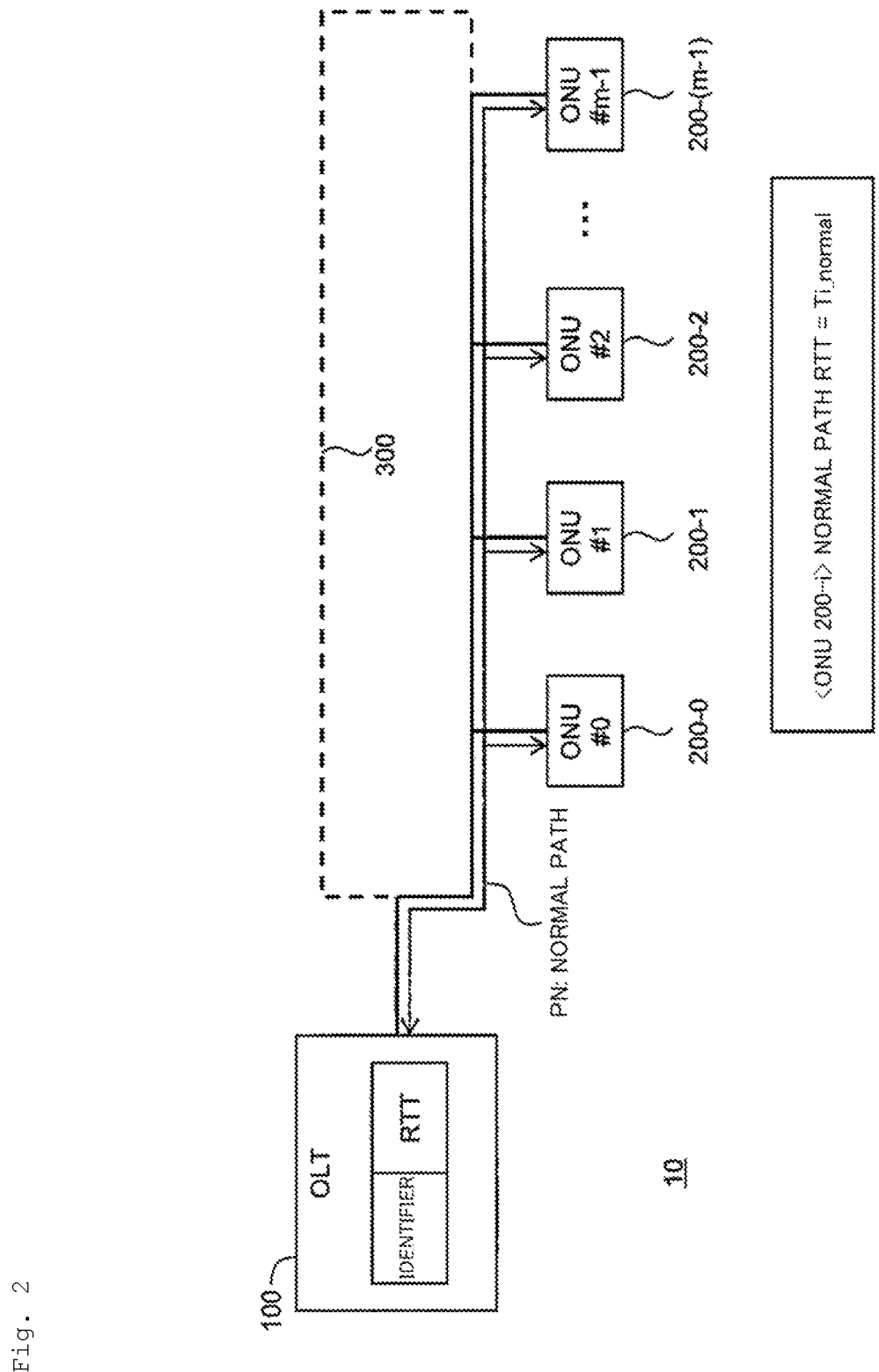
FIG. 2 is a conceptual diagram for describing normal operation of the optical communication system according to the embodiment of the present invention.

FIG. 2 is a conceptual diagram for describing normal operation of the optical communication system 10. In normal operation, the OLT 100 performs communication with each of the ONUs 200 via the normal path PN. To achieve this, the OLT 100 enables the normal path PN and disables the backup path PS.

First, the OLT 100 executes "registration processing (discovery)" for registering the ONUs 200 in order to establish communication links with the ONUs 200 that are connected to the PON network. In the registration processing, the OLT 100 detects the ONUs 200 that are connected to the PON network and assigns an identifier to each detected ONU 200. The OLT 100 notifies the ONUs 200 of the assigned identifiers, and the ONUs 200 each hold the notified identifier. Also, in the registration processing, the OLT 100 executes "ranging processing" for measuring the round-trip propagation time (hereinafter referred to as RTT (Round Trip Time)) between the OLT 100 and each of the ONUs 200. The ranging processing will be described in detail later. The OLT 100 holds an identifier and an RTT in association with each of the ONUs 200. After the registration processing is complete, the OLT 100 begins performing communication with the ONUs 200.

The OLT 100 executes "communication control processing" for controlling communication with each of the ONUs 200. Uplink communication from the ONUs 200 to the OLT 100 is performed using the same wavelength through TDMA (Time Division Multiple Access). In order to prevent uplink optical signals transmitted from the ONUs 200 from colliding with each other, the OLT 100 determines a transmission timing and a transmission amount for the uplink optical signals from each of the ONUs 200 based on the corresponding RTTs of the ONUs 200. The OLT 100 then generates transmission permission information that includes an identifier, a transmission timing, and a transmission amount for each of the ONUs 200.

The OLT 100 transmits the generated transmission permission information to each of the ONUs 200. The transmission permission information reaches the ONUs 200 through the normal path PN. The ONUs 200 reference the identifiers included in the transmission permission information and identify a corresponding portion of the transmission permission information. The ONUs 200 each then transmit an uplink optical signal in accordance with the transmission timing and the transmission amount indicated by the transmission permission information. The uplink optical signals transmitted from the ONUs 200 reach the OLT 100 through the normal path PN.

In this way, the OLT 100 holds an RTT for each of the ONUs 200 and executes communication control processing for controlling communication with the ONUs 200 based on the RTTs. For convenience, the RTT for the case of communication via the normal path PN is hereinafter referred to as "normal path RTT". During normal operation shown in FIG. 2, the OLT 100 holds a normal path RTT for each of the ONUs 200, and executes communication control processing for the ONUs 200 based on the normal path RTTs.

1-3. Protection

Next, a protection technique used in the optical communication system 10 according to the present embodiment will be described.

Figure 3:
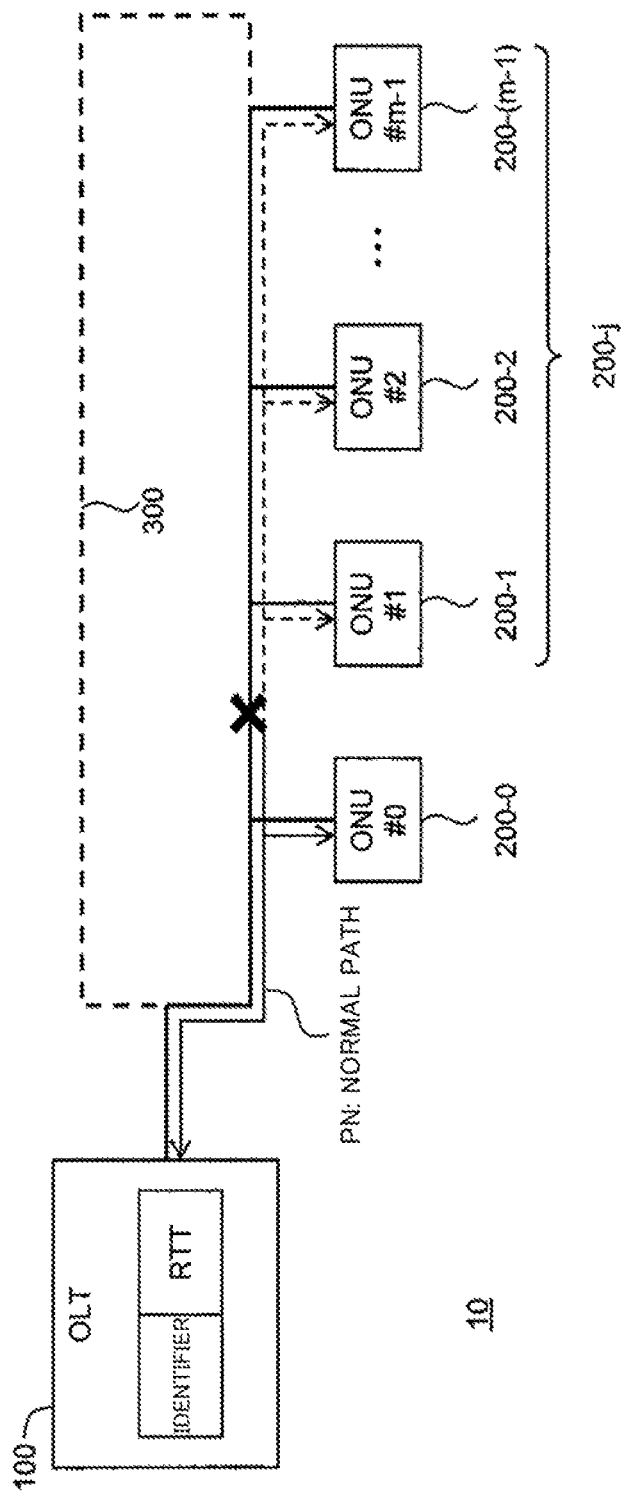
FIG. 3 is a conceptual diagram for describing a situation in which a fiber has become disconnected in the optical communication system according to the embodiment of the present invention.

FIG. 3 is a conceptual diagram for describing a situation in which a fiber has become disconnected in the normal path PN. In a bus topology, if a fiber becomes disconnected, communication with many ONUs 200 may be cut off. In the case of the example shown in FIG. 3, a fiber disconnection occurs in the section between the ON 200-0 and the ONU 200-1. As a result, communication with the ONUs 200-1 to 200-(m−1) is cut off. The ONUs 200 that cannot perform communication via the normal path PN are each hereinafter referred to as a "disconnected ONU 200-j". In the example shown in FIG. 3, the ONUs 200-1 to 200-(m−1) are respectively disconnected ONUs 200-j (j=1 to m−1). According to the present embodiment, the above-described backup path PS is used in order to quickly resume (recover) communication with the disconnected ONUs 200-j.

Figure 4:
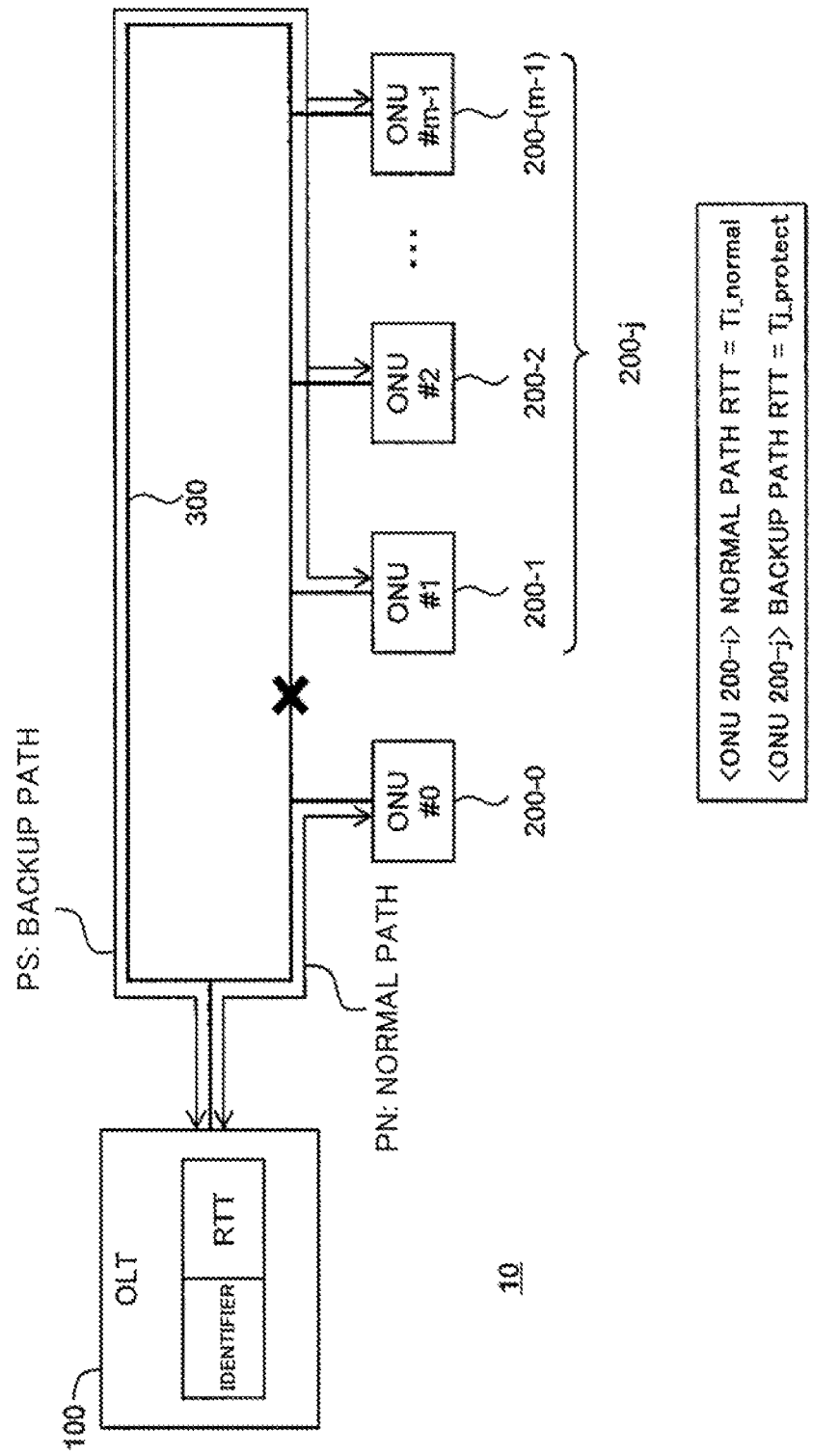
FIG. 4 is a conceptual diagram for describing operations performed using a normal path and a backup path in the optical communication system according to the embodiment of the present invention.

FIG. 4 is a conceptual diagram for describing operations performed using the normal path PN and the backup path PS in the optical communication system 10. The OLT 100 enables the backup path PS in addition to the normal path PN. In the case of the ONU 200-0 at a location before the fiber disconnection point, the OLT 100 performs communication with that ONU via the normal path PN. On the other hand, in the case of the disconnected ONUs 200-j (j=1 to m−1), the OLT 100 performs communication with those ONUs via the backup path PS instead of the normal path PN. This makes it possible to resume communication with all of the disconnected ONUs 200-j without waiting for repair of the optical fiber that constitutes the normal path PN.

However, the RTT for communication via the backup path PS is required in order to execute communication control processing for the disconnected ONUS 200-j. The RTT for communication via the backup path PS is hereinafter referred to as the "backup path RTT". The OLT 100 needs to be aware of the backup path RTT for all of the disconnected ONUS 200-j before resuming communication control processing. In view of this, the OLT 100 executes ranging processing for the disconnected ONUS 200-j in order to measure the backup path RTT for each of the disconnected ONUS 200-j. The ranging processing will be described in detail later. After acquiring the backup path RTTs, the OLT 100 resumes communication control processing for the disconnected ONUS 200-j based on the backup path RTTs.

Even after a disconnected ONU 200-j is detected, the OLT 100 holds the registration information (an identifier and a normal path RTT) for that disconnected ONU 200-j instead of deleting it. The identifier of the disconnected ONU 200-j does not change, and thus does not need to be updated.

2. RANGING PROCESSING

Figure 5:
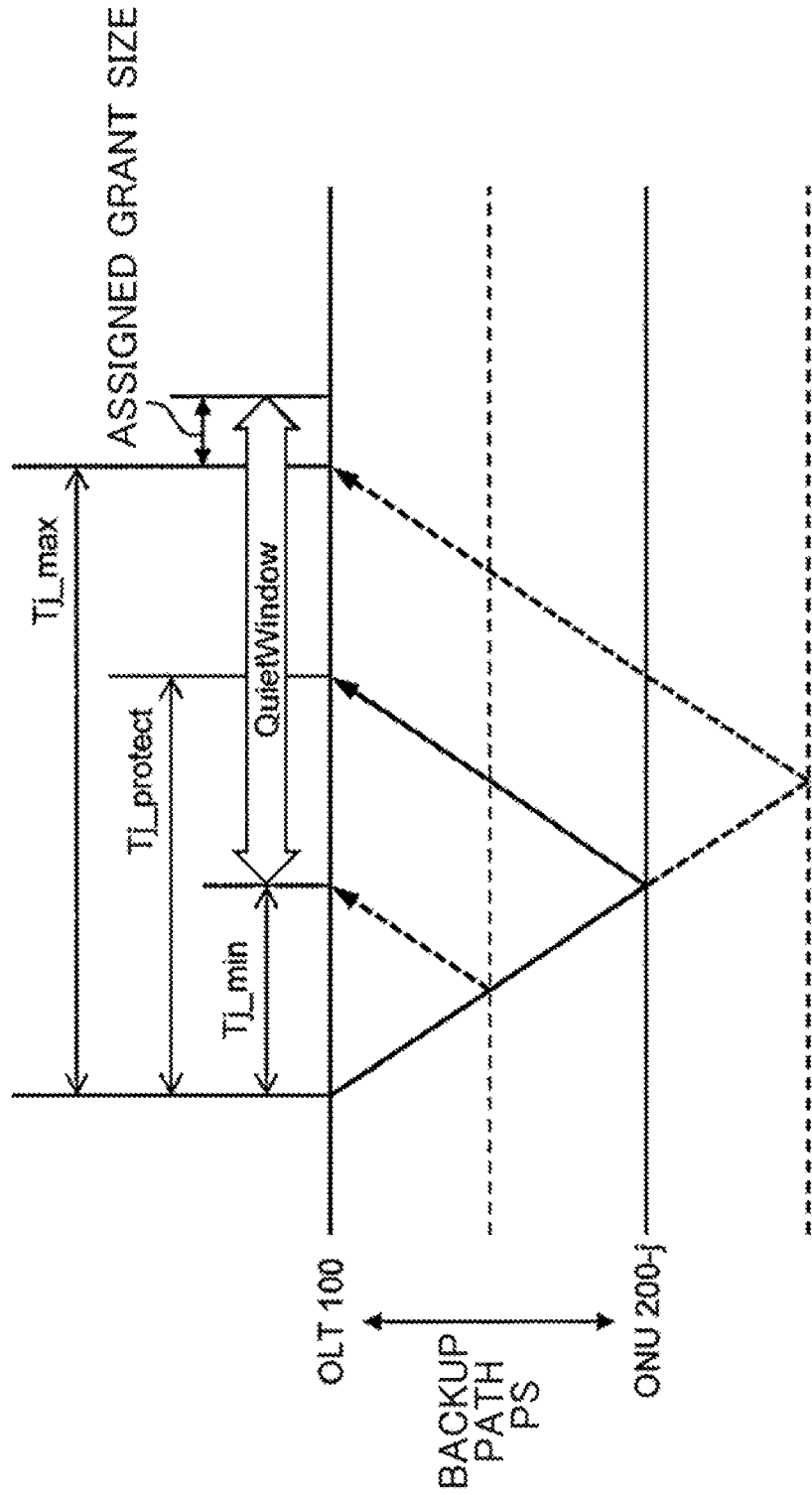
FIG. 5 is a conceptual diagram for describing ranging processing in the optical communication system according to the embodiment of the present invention.

FIG. 5 is a conceptual diagram for describing ranging processing for RTT measurement. The horizontal axis in FIG. 5 represents time. The following particularly describes ranging processing for measuring the backup path RTT (Tj_protect) for a disconnected ONU 200-j. The OLT 100 transmits a ranging request signal to the disconnected ONU 200-j. The ranging request signal reaches the disconnected ONU 200-j through the backup path PS. Upon receiving the ranging request signal, the disconnected ONU 200-j returns a response signal to the OLT 100. Note that in FIG. 5, the delay time in the disconnected ONU 200-j is not shown. The response signal reaches the OLT 100 via the backup path PS. The OLT 100 calculates the backup path RTT (Tj_protect) for the disconnected ONU 200-j based on the transmission time of the ranging request signal and the reception time of the response signal.

Because the backup path RTT (Tj_protect) is unknown before execution of the ranging processing, it is not known what time the response signal from the disconnected ONU 200-j will reach the OLT 100. In order to prevent collision between the response signal from the disconnected ONU 200-j and an uplink optical signal from another ONU 200 (an ONU 200 that can perform communication via the normal path PN), a "QuietWindow" is set similarly to the case of normal ranging processing. A QuietWindow is a period for receiving the response signal from the disconnected ONU 200-j that is the target of the ranging processing. During the QuietWindow period, uplink communication from other ONUS 200 is temporarily stopped. The OLT 100 calculates the backup path RTT (Tj_protect) based on the response signal received in QuietWindow.

The following describes a basic method for setting the QuietWindow. A range of possible backup path RTTs (Tj_protect) for the disconnected ONU 200-j is taken into consideration. The maximum value of the envisioned backup path RTT (Tj_protect) is hereinafter referred to as the "envisioned maximum value (Tj_max)". Also, the minimum value of the envisioned backup path RTT (Tj_protect) is hereinafter referred to as the "envisioned minimum value (Tj_min)". The Grant size assigned to the response signal from the disconnected ONU 200-j is also taken into consideration. As a result, as shown in FIG. 5, the size of the QuietWindow for measuring the backup path RTT (Tj_protect) is the result of adding the assigned Grant size to the duration from the envisioned minimum value (Tj_min) to the envisioned maximum value (Tj_max).

Consider the maximum setting of the QuietWindow as one example. In the case of the maximum setting, the envisioned minimum value (Tj_min) and the envisioned maximum value (Tj_max) are a predetermined minimum value (T_MIN) and a predetermined maximum value (T_MAX), respectively. The predetermined minimum value (T_MIN) is the RTT corresponding to a distance of 0 km, that is to say 0 μs, for example. On the other hand, the predetermined maximum value (T_MAX) is the RTT corresponding to the maximum accommodating distance in the optical communication system 10. For example, if the maximum accommodating distance is 20 km, the predetermined maximum value (T_MAX) is approximately 200 μs. In this case of the maximum setting, the size of QuietWindow is a predetermined maximum size (default size).

In this way, the OLT 100 sets the size of the QuietWindow based on the envisioned maximum value (Tj_max) and the envisioned minimum value (Tj_min) of the backup path RTT (Tj_protect). The OLT 100 then executes ranging processing based on the set QuietWindow, and measures the backup path RTT (Tj_protect) for the disconnected ONU 200-j.

However, it takes a certain amount of time to measure the backup path RTT (Tj_protect) for all of the disconnected ONUs 200-j. This contributes to an increase in the time required to resume communication. In particular, in the case of the above-described maximum setting, the QuietWindow is set to the predetermined maximum size, and the time required for resuming communication increases. Also, it is necessary to temporarily suspend uplink communication from other ONUs 200 during the QuietWindow period. As a result, uplink communication on the normal path PN is temporarily suspended, and uplink delay occurs.

In view of this, the present embodiment provides a technique capable of reducing (limiting) the size of the QuietWindow. If the size of the QuietWindow is reduced, the time required for ranging processing is shortened. As a result, the time required to resume communication is shortened. Also, suspension and uplink delay in uplink communication caused by the ranging processing are suppressed.

Figure 6:
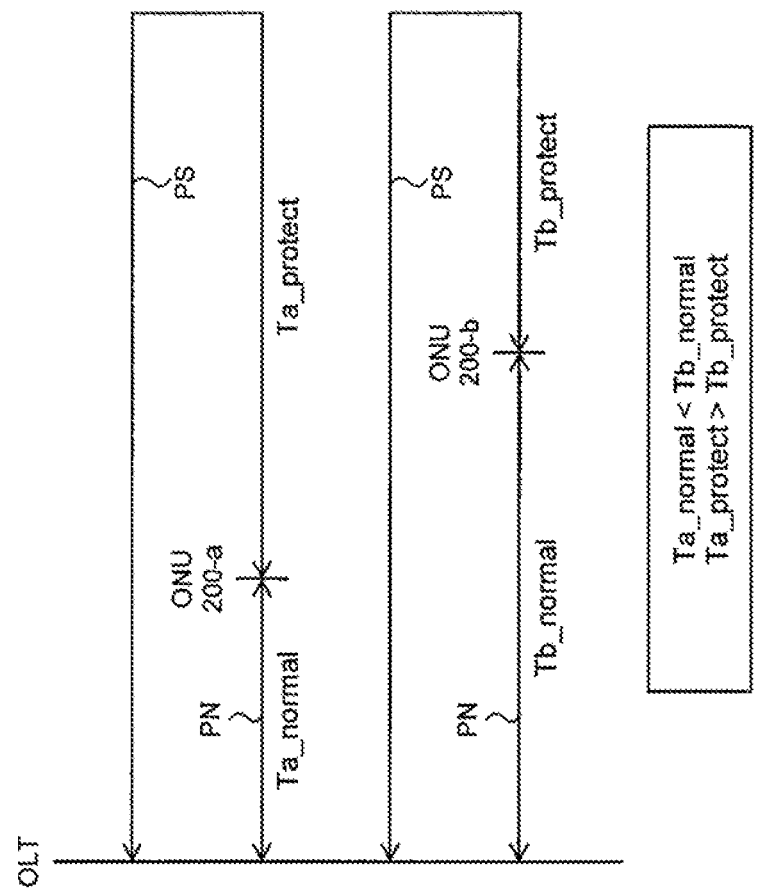
FIG. 6 is a conceptual diagram for describing the principle of QuietWindow setting according to the embodiment of the present invention.

FIG. 6 is a conceptual diagram for describing the principle of QuietWindow setting according to the present embodiment. FIG. 6 shows the normal path RTT (Tj_normal) and the backup path RTT (Tj_protect) for the two disconnected ONUS 200-j. For convenience, one disconnected ONU 200-j will be referred to as the "first ONU 200-a", and the other disconnected ONU 200-j will be referred to as the "second ONU 200-b". The normal path RTT and the backup path RTT between the OLT 100 and the first ONU 200-a (first slave station device) will be referred to as the "first normal path RTT (Ta_normal)" and the "first backup path RTT (Ta_protect)", respectively. The normal path RTT and the backup path RTT between the OLT 100 and the second ONU 200-b (second slave station device) will be referred to as the "second normal path RTT (Tb_normal)" and the "second backup path RTT (Tb_protect)", respectively.

As shown in FIG. 6, the first normal path RTT (Ta_normal) is shorter than the second normal path RTT (Tb_normal), and the second normal path RTT (Tb_normal) is longer than the first normal path RTT (Ta_normal). In this case, it is thought that the first backup path RTT (Ta_protect) is longer than the second backup path RTT (Tb_protect), and the second backup path RTT (Tb_protect) is shorter than the first backup path RTT (Ta_protect). Because the ONUS 200 are connected to the loop path 300 in parallel, the magnitude relationship between the backup path RTTs is opposite to the magnitude relationship between the normal path RTTs.

Even after a disconnected ONU 200-j is detected, the OLT 100 holds the normal path RTT (Tj_normal) for that disconnected ONU 200-j instead of deleting it. Accordingly, the OLT 100 can estimate the magnitude relationship between the first backup path RTT (Ta_protect) and the second backup path RTT (Tb_protect) based on the magnitude relationship between the first normal path RTT (Ta_normal) and the second normal path RTT (Tb_normal). The OLT 100 then limits the size of the QuietWindow in consideration of the magnitude relationship between the first backup path RTT (Ta_protect) and the second backup path RTT (Tb_protect).

For example, given that the second backup path RTT (Tb_protect) is shorter than the first backup path RTT (Ta_protect), it can be estimated that the second backup path RTT (Tb_protect) is at least shorter than the predetermined maximum value (T_MAX) corresponding to the maximum accommodating distance. Accordingly, the OLT 100 can at least set the envisioned maximum value (Tb_max) of the second backup path RTT (Tb_protect) smaller than the predetermined maximum value (T_MAX) corresponding to the maximum accommodating distance. Given that the envisioned maximum value (Tb_max) of the second backup path RTT (Tb_protect) is smaller than the predetermined maximum value (T_MAX), the size of the QuietWindow used when measuring the second backup path RTT (Tb_protect) is set smaller than the predetermined maximum size in the case of maximum setting.

As another example, given that the first backup path RTT (Ta_protect) is longer than the second backup path RTT (Tb_protect), it can be envisioned that the first backup path RTT (Ta_protect) is at least longer than the predetermined minimum value (T_MIN). Accordingly, the OLT 100 can at least set the envisioned minimum value (Ta_min) of the first backup path RTT (Ta_protect) larger than the predetermined minimum value (T_MIN). Given that the envisioned minimum value (Ta_min) of the first backup path RTT (Ta_protect) is larger than the predetermined minimum value (T_MIN), the size of the QuietWindow used when measuring the first backup path RTT (Ta_protect) is set smaller than the predetermined maximum size in the case of maximum setting.

As described above, according to the present embodiment, because the ONUs 200-i (i=0 to m−1) are connected to the loop path 300 in parallel, the magnitude relationship between the backup path RTTs is opposite to the magnitude relationship between the normal path RTTs. If the second normal path RTT (Tb_normal) for the second ONU 200-b is longer than the first normal path RTT (Ta_normal) for the first ONU 200-a, then the first backup path RTT (Ta_protect) is longer than the second backup path RTT (Tb_protect), and the second backup path RTT (Tb_protect) is shorter than the first backup path RTT (Ta_protect). Based on this, the OLT 100 limits the size of the QuietWindow used when measuring the backup path RTT (Tj_protect) to a value smaller than the predetermined maximum size (default size). Because the size of QuietWindow is reduced, the time required for the ranging processing for measuring the backup path RTT (Tj_protect) is shortened. As a result, the time required to resume communication is shortened. Also, suspension and uplink delay in uplink communication caused by the ranging processing are suppressed.

3. VARIOUS EXAMPLES OF QUIETWINDOW SETTING METHOD

Hereinafter, various examples of the QuietWindow setting method according to the present embodiment will be described.

3-1. First Example

Figure 7:
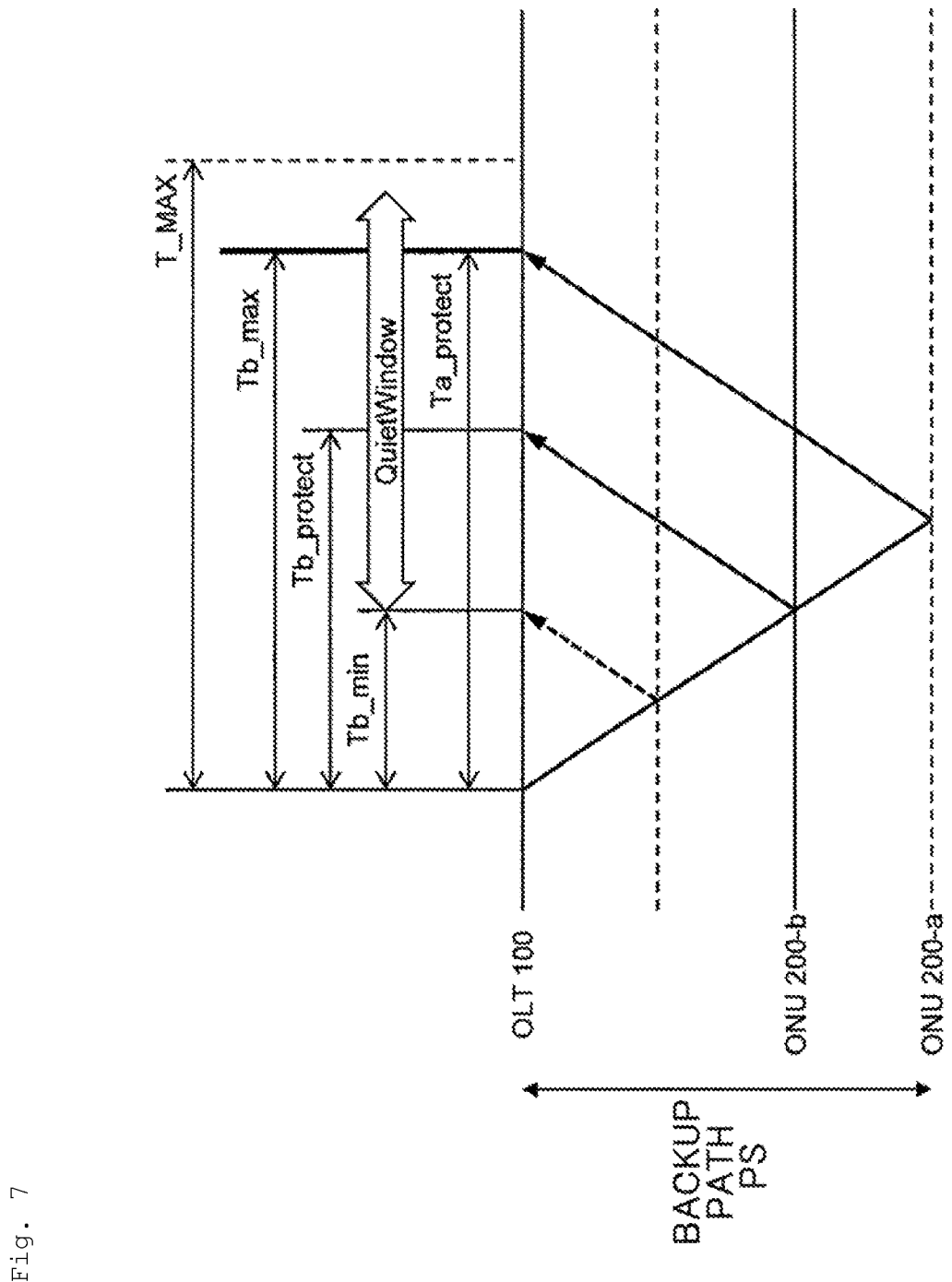
FIG. 7 is a conceptual diagram for describing a first example of a QuietWindow setting method according to the embodiment of the present invention.

FIG. 7 is a conceptual diagram for describing a first example of the QuietWindow setting method. The second backup path RTT (Tb_protect) is shorter than the first backup path RTT (Ta_protect). Accordingly, the OLT 100 sets the envisioned maximum value (Tb_max) of the second backup path RTT (Tb_protect) smaller than the envisioned maximum value (Ta_max) of the first backup path RTT (Ta_protect). In particular, as shown in FIG. 7, the OLT 100 measures the first backup path RTT (Ta_protect) and then sets the measured first backup path RTT (Ta_protect) as the envisioned maximum value (Tb_max) of the second backup path RTT (Tb_protect).

As an example, consider the situation shown in FIGS. 3 and 4, which is a situation in which a fiber becomes disconnected in the section between the ON 200-0 and the ONU 200-1. In this situation, the ONUs 200-1 to 200-(m−1) are disconnected ONUS 200-j (j=1 to m−1).

First, the OLT 100 sets the QuietWindow for the ONU 200-1, which has the shortest normal path RTT among the disconnected ONUS 200-j. The OLT 100 sets the envisioned maximum value (T1_max) of the backup path RTT (T1_protect) for the ONU 200-1 to the predetermined maximum value (T_MAX) that corresponds to the maximum accommodating distance. The OLT 100 then measures the backup path RTT (T1_protect) for the ONU 200-1 based on the set QuietWindow.

The OLT 100 then sets the QuietWindow for the ONU 200-2, which has the next shortest normal path RTT. At this time, the ONU 200-1 corresponds to the "first ONU 200-a" and the ONU 200-2 corresponds to the "second ONU 200-b". The OLT 100 sets the envisioned maximum value (T2_max) of the second backup path RTT (T2_protect) for the ONU 200-2 to the first backup path RTT (T1_protect) that was measured for the ONU 200-1. The OLT 100 then measures the second backup path RTT (T2_protect) for the ONU 200-2 based on the set QuietWindow.

Next, the OLT 100 sets the QuietWindow for the ONU 200-3, which has the next shortest normal path RTT. At this time, the ONU 200-2 corresponds to the "first ONU 200-a" and the ONU 200-3 corresponds to the "second ONU 200-b". The OLT 100 sets the envisioned maximum value (T3_max) of the second backup path RTT (T3_protect) for the ONU 200-3 to the first backup path RTT (T2_protect) that was measured for the ONU 200-2. The OLT 100 then measures the second backup path RTT (T3_protect) for the ONU 200-3 based on the set QuietWindow.

Similar processing is repeated in order until the ONU 200-(m−1), which has the longest normal path RTT. The pair of "first ONU 200-a, first backup path RTT" and "second ONU 200-b, second backup path RTT" shifts in order from the ONU 200-1 to the ONU 200-(m−1). Also, the envisioned maximum value (Tj_max) of the backup path RTT (Tj_protect) progressively decreases from the ONU 200-1 to the ONU 200-(m−1). In other words, the size of the QuietWindow progressively decreases from the ONU 200-1 to the ONU 200-(m−1).

In this way, according to the first example, the OLT 100 sets the envisioned maximum value (Ta_max) of the first backup path RTT (Ta_protect) for the first ONU 200-a to the predetermined maximum value (T_MAX) or less. Furthermore, based on the fact that the second backup path RTT (Tb_protect) is shorter than the first backup path RTT (Ta_protect), the OLT 100 sets the envisioned maximum value (Tb_max) of the second backup path RTT (Tb_protect) smaller than the envisioned maximum value (Ta_max) of the first backup path RTT (Ta_protect). Accordingly, the size of the QuietWindow used when measuring the second backup path RTT (Tb_protect) is smaller than the predetermined maximum size.

3-2. Second Example

Figure 8:
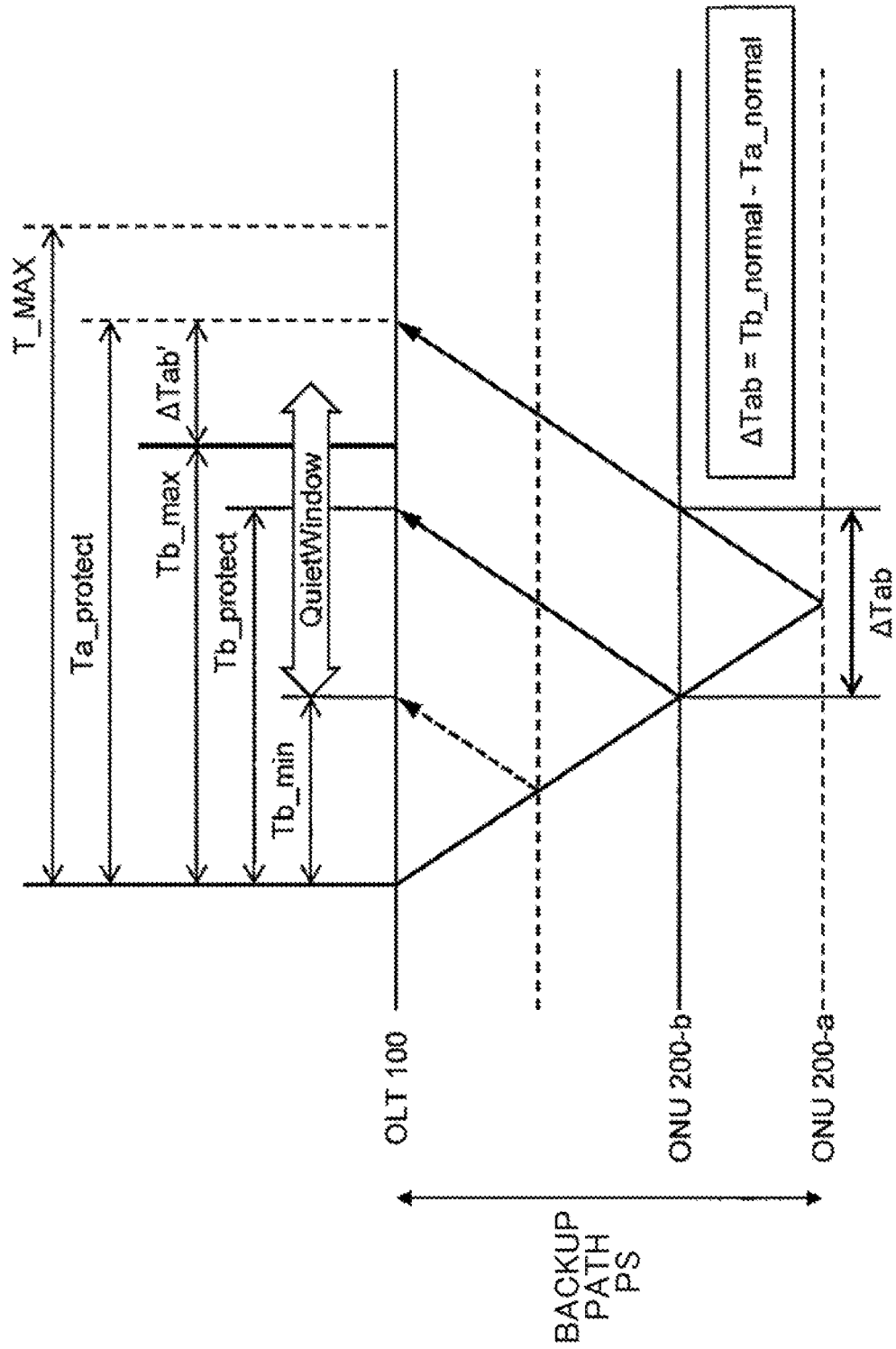
FIG. 8 is a conceptual diagram for describing a second example of the QuietWindow setting method according to the embodiment of the present invention.

FIG. 8 is a conceptual diagram for describing a second example of the QuietWindow setting method. The second example is a modification of the first example. Portions that are redundant with the first example will not be described.

As described above, the second backup path RTT (Tb_protect) is shorter than the first backup path RTT (Ta_protect). The OLT 100 first measures the first backup path RTT (Ta_protect) for the first ONU 200-a. After that, the OLT 100 sets the envisioned maximum value (Ta_max) of the second backup path RTT (Tb_protect) smaller than the measured first backup path RTT (Ta_protect) by an amount corresponding to a difference ΔTab'.

More specifically, the RTT difference between the first backup path RTT (Ta_protect) and the second backup path RTT (Tb_protect) corresponds to an RTT difference ΔTab between the second normal path RTT (Tb_normal) and the first normal path RTT (Ta_normal). The OLT 100 calculates the RTT difference ΔTab using the second normal path RTT (Tb_normal) and the first normal path RTT (Ta_normal). Also, the OLT 100 sets the difference ΔTab' such that the RTT difference is less than or equal to ΔTab. The difference ΔTab' may be the same as the RTT difference ΔTab. The OLT 100 then sets the envisioned maximum value (Tb_max) of the second backup path RTT (Tb_protect) smaller than the measured first backup path RTT (Ta_protect) by an amount corresponding to the difference ΔTab'.

According to the second example, effects similar to those in the case of the first example can be obtained.

3-3. Third Example

Figure 9:
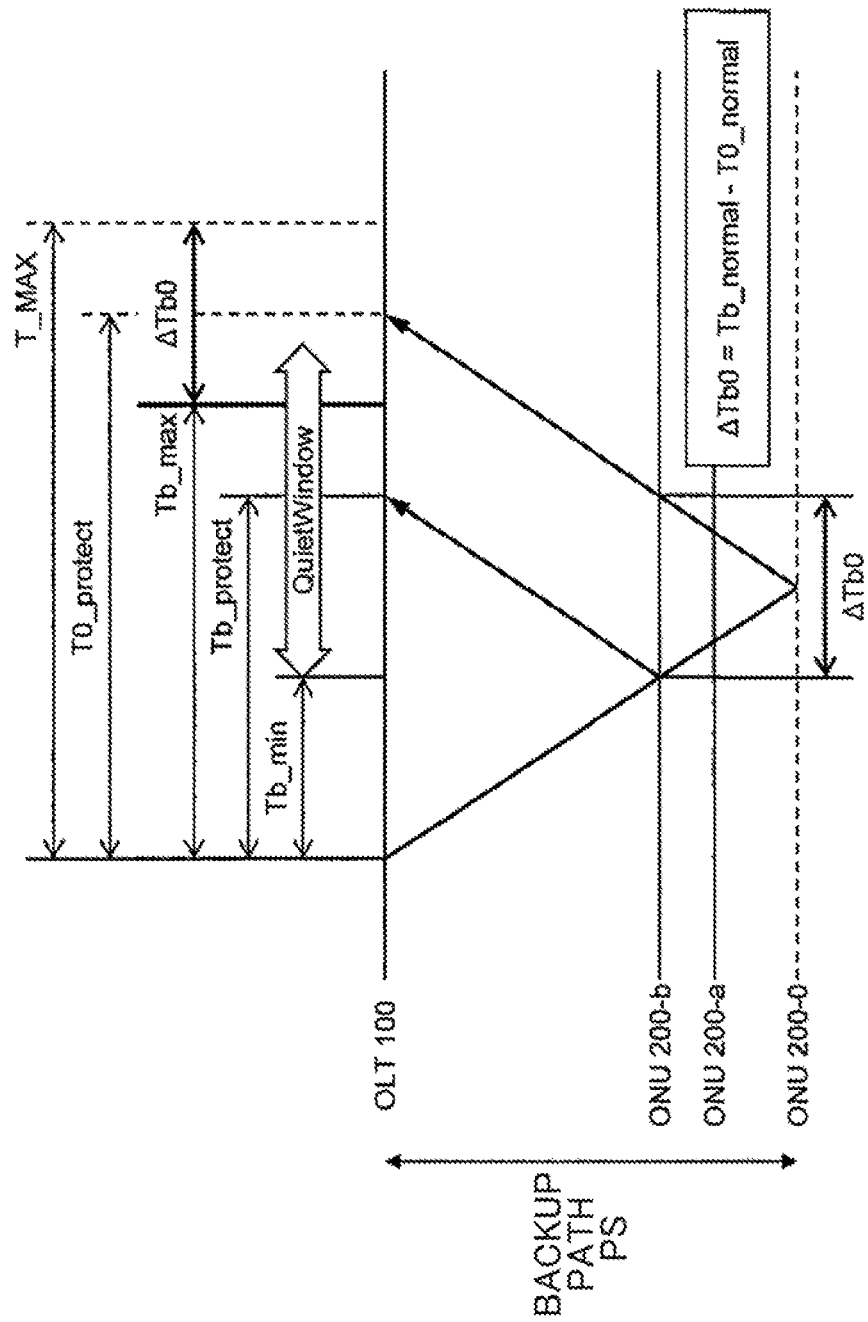
FIG. 9 is a conceptual diagram for describing a third example of the QuietWindow setting method according to the embodiment of the present invention.

FIG. 9 is a conceptual diagram for describing a third example of the QuietWindow setting method. The normal path RTT (T0_normal) for the ONU 200-0 (third slave station device) is the smallest out of all of the ONUs 200. Accordingly, the backup path RTT (T0_protect) for the ONU 200-0 is the largest out of all of the ONUs 200. This smallest normal path RTT (T0_normal) will hereinafter be referred to as the "third normal path RTT". Also, the largest backup path RTT (T0_protect) will hereinafter be referred to as the "third backup path RTT".

The second backup path RTT (Tb_protect) for the second ONU 200-b is at least shorter than the third backup path RTT (T0_protect). The RTT difference between the third backup path RTT (T0_protect) and the second backup path RTT (Tb_protect) corresponds to the RTT difference ΔTb0 between the second normal path RTT (Tb_normal) and the third normal path RTT (T0_normal). The OLT 100 calculates the RTT difference ΔTb0 using the second normal path RTT (Tb_normal) and the third backup path RTT (T0_normal). The OLT 100 then sets the envisioned maximum value (Tb_max) of the second backup path RTT (Tb_protect) smaller than the predetermined maximum value (T_MAX) by an amount corresponding to the RTT difference ΔTb0. As a result, the size of the QuietWindow for measuring the second backup path RTT (Tb_protect) is smaller than the predetermined maximum size.

The OLT 100 may set the envisioned maximum value (Ta_max) of the first backup path RTT (Ta_protect) in a similar manner. Specifically, an RTT difference ΔTax is the difference between the first normal path RTT (Ta_normal) and the third normal path RTT (T0_normal). The OLT 100 may set the envisioned maximum value (Ta_max) of the first backup path RTT (Ta_protect) smaller than the predetermined maximum value (T_MAX) by an amount corresponding to the RTT difference ΔTa0.

3-4. Fourth Example

Figure 10:
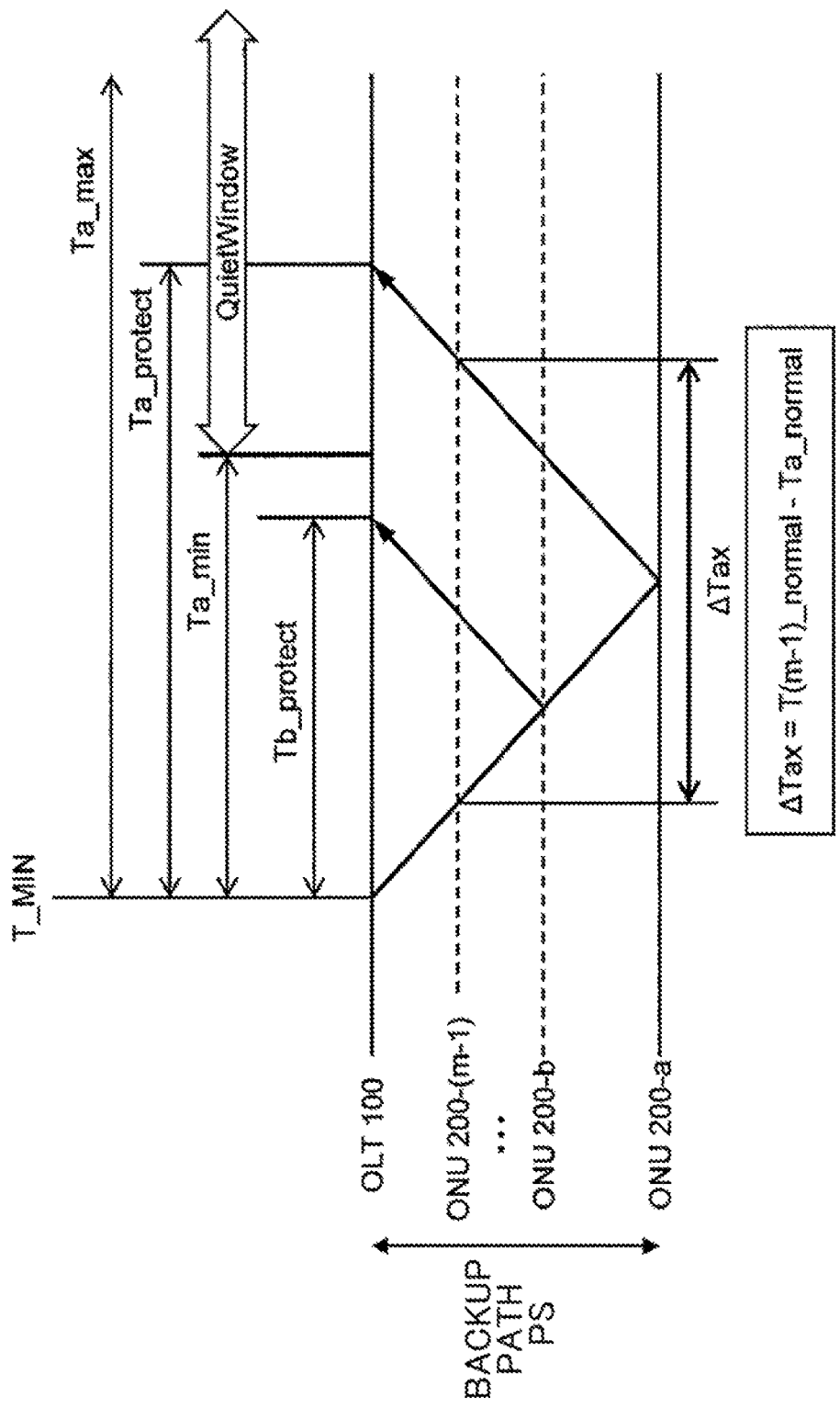
FIG. 10 is a conceptual diagram for describing a fourth example of the QuietWindow setting method according to the embodiment of the present invention.

FIG. 10 is a conceptual diagram for describing a fourth example of the QuietWindow setting method. The first backup path RTT (Ta_protect) is longer than the second backup path RTT (Tb_protect). This means that the first backup path RTT (Ta_protect) is at least longer than the predetermined minimum value (T_MIN). Accordingly, the OLT 100 sets the envisioned minimum value (Ta_min) of the first backup path RTT (Ta_protect) at least larger than the predetermined minimum value (T_MIN). Accordingly, the size of the QuietWindow used when measuring the first backup path RTT (Ta_protect) is smaller than the predetermined maximum size.

In order to set the envisioned minimum value (Ta_min) of the first backup path RTT (Ta_protect), consider the ONU 200-(m-1) (fourth slave station device) for example. The normal path RTT (T(m-1)_normal) for the ONU 200-(m-1) is the largest out of all of the ONUS 200. Accordingly, the backup path RTT (T(m-1)_protect) for the ONU 200-(m-1) is the smallest out of all of the ONUS 200. The maximum normal path RTT (T(m-1) normal) will hereinafter be referred to as the "fourth normal path RTT". Also, the smallest backup path RTT (T(m-1) protect) will hereinafter be referred to as the "fourth backup path RTT".

The first backup path RTT (Ta_protect) for the first ONU 200-a is at least longer than the fourth backup path RTT (T(m-1)_protect). The RTT difference between the first backup path RTT (Ta_protect) and the fourth backup path RTT (T(m-1)_protect) corresponds to the RTT difference ΔTax between the fourth normal path RTT (T(m-1)_normal) and the first normal path RTT (Ta_normal). The OLT 100 calculates the RTT difference ΔTax using the fourth normal path RTT (T(m-1)_normal) and the first normal path RTT (Ta_normal). Alternatively, the OLT 100 may calculates the RTT difference ΔTax by integrating the difference in normal path RTT between two adjacent ONUs over the range from the first ONU 200-a to the ONU 200-(m-1). The OLT 100 then sets the envisioned minimum value (Ta_min) of the first backup path RTT (Ta_protect) larger than the predetermined minimum value (T_MIN) by an amount corresponding to the RTT difference ΔTax. As a result, the size of the QuietWindow used when measuring the first backup path RTT (Ta_protect) is smaller than the predetermined maximum size.

The OLT 100 may set the envisioned minimum value (Tb_min) of the second backup path RTT (Tb_protect) in a similar manner. Specifically, the RTT difference ΔTbx is the difference between the fourth normal path RTT (T(m-1)_normal) and the second normal path RTT (Tb_normal). The OLT 100 may set the envisioned minimum value (Tb_min) of the second backup path RTT (Tb_protect) larger than the predetermined minimum value (T_MIN) by an amount corresponding to the RTT difference ΔTbx.

3-5. Fifth Example

It is also possible to combine any of the first to third examples described above with the fourth example. In this case, the envisioned maximum value (Tj_max) of the backup path RTT (Tj_protect) is set using the technique described in any of the first to third examples. On the other hand, the envisioned minimum value (Tj_min) of the backup path RTT (Tj_protect) is set using the technique described in the fourth example. According to the fifth example, the size of the QuietWindow is further reduced.

3-6. Sixth Example

Figure 11:
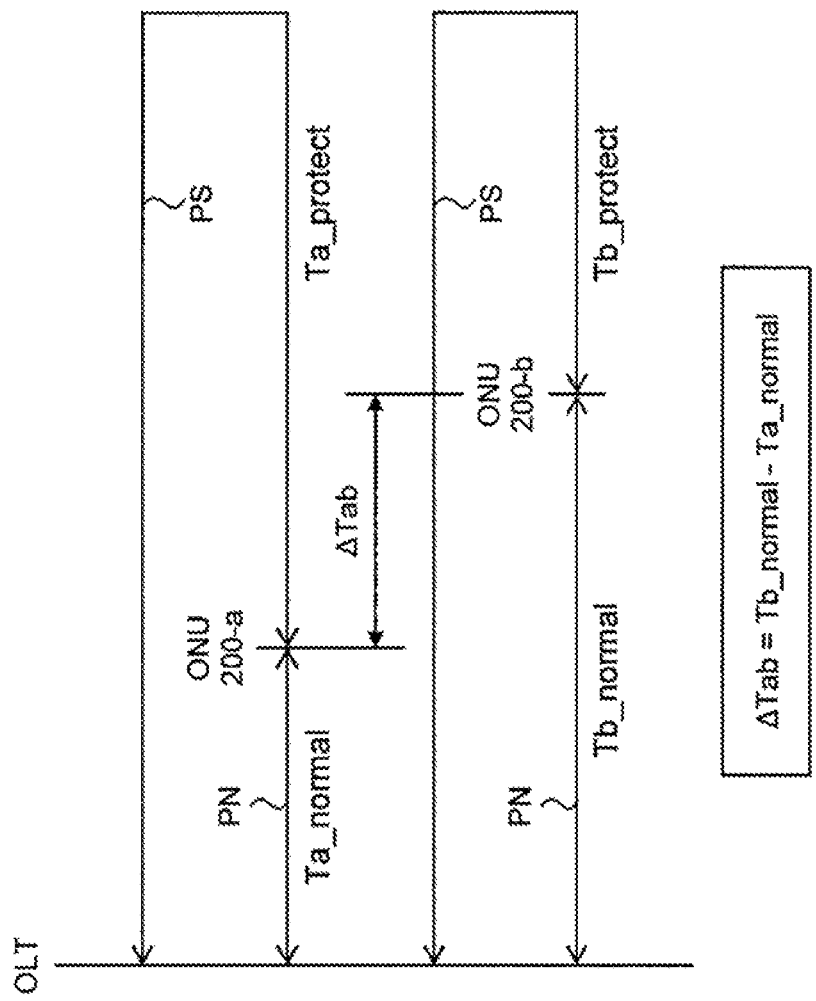
FIG. 11 is a conceptual diagram for describing a sixth example of the QuietWindow setting method according to the embodiment of the present invention.

FIG. 11 is a conceptual diagram for describing a sixth example of the QuietWindow setting method. The OLT 100 first measures the first backup path RTT (Ta_protect) for the first ONU 200-a. The OLT 100 then estimates (narrows down) the range of the second backup path RTT (Tb_protect) for the second ONU 200-b based on the measured first backup path RTT (Ta_protect).

More specifically, the second backup path RTT (Tb_protect) is shorter than the first backup path RTT (Ta_protect). The RTT between the first backup path RTT (Ta_protect) and the second backup path RTT (Tb_protect) corresponds to the RTT difference ΔTab between the second normal path RTT (Tb_normal) and the first normal path RTT (Ta_normal). The OLT 100 calculates the RTT difference ΔTab using the second normal path RTT (Tb_normal) and the first normal path RTT (Ta_normal). The OLT 100 then estimates (narrows down) the range of the second backup path RTT (Tb_protect) based on the measured first backup path RTT (Ta_protect) and the RTT difference ΔTab, while also giving consideration to error.

Figure 12:
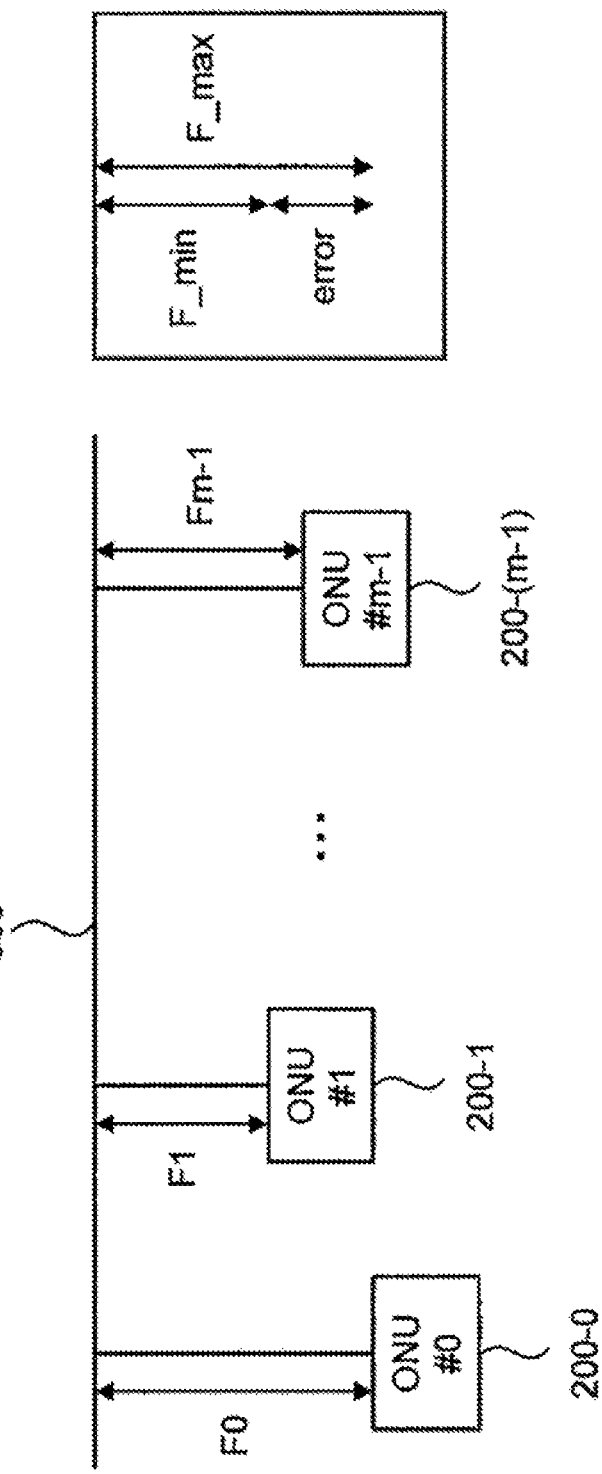
FIG. 12 is a conceptual diagram for describing the sixth example of the QuietWindow setting method according to the embodiment of the present invention.

FIG. 12 is a conceptual diagram for describing an example of a cause of such error. A connection distance Fi between the loop path 300 and each of the ONUs 200-i (i=0 to m-1) is in the range between a minimum length F_min and a maximum length F_max. The range of variation in the connection distance Fi causes error in the estimated second backup path RTT (Tb_protect). When estimating the range of the second backup path RTT (Tb_protect), the OLT 100 also gives consideration to such error caused by the range of variation in the connection distance Fi.

The OLT 100 sets the size of the QuietWindow in accordance with the estimated range of the second backup path RTT (Tb_protect). The size of the QuietWindow is thus reduced. The OLT 100 then measures the second backup path RTT (Tb_protect) based on the QuietWindow.

For example, using the technique described in the fourth example above, the OLT 100 sets the QuietWindow for measuring the first backup path RTT (Ta_protect), and measures the first backup path RTT (Ta_protect). After that, using the technique of this example, the OLT 100 sets the QuietWindow for measuring the second backup path RTT (Tb_protect), and measures the second backup path RTT (Tb_protect).

If the connection distances Fi are all the same, the aforementioned error can be ignored. The error can also be ignored if the range of variation in the connection distance Fi is less than or equal to a distance that corresponds to a threshold value of time stamp drift (e.g., in the case of EPON, about 25 m corresponding to 16 TQ=256 ns). If the error can be ignored, the OLT 100 may use, as-is, the second backup path RTT (Tb_protect) that is obtained based on the first backup path RTT (Ta_protect) and the RTT difference ΔTab, without performing ranging processing.

4. EXAMPLE OF CONFIGURATION OF OPTICAL COMMUNICATION SYSTEM

Figure 13:
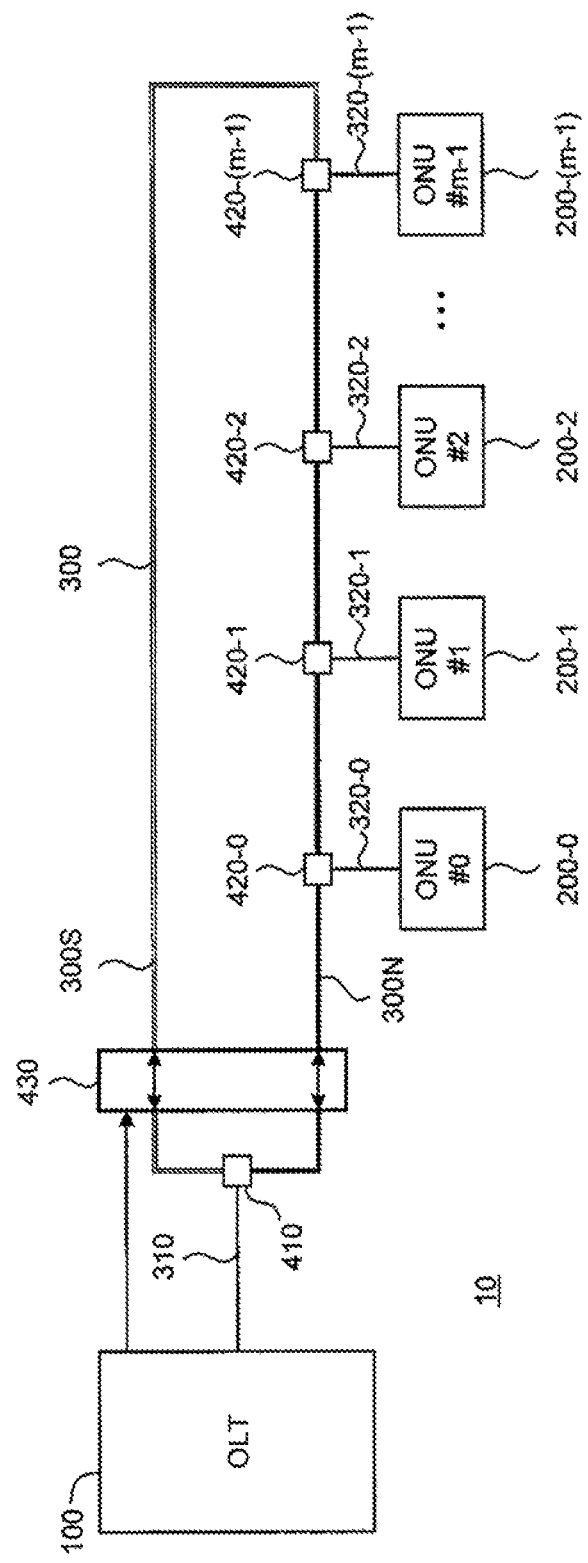
FIG. 13 is a conceptual diagram showing an example of the configuration of the optical communication system according to the embodiment of the present invention.

FIG. 13 is a conceptual diagram showing an example of the configuration of the optical communication system 10 according to the present embodiment. In this example, the optical communication system 10 is a TWDM-PON (Time and Wavelength Division Multiplexing-PON) system that employs wavelength division multiplexing (WDM) technology.

The optical communication system 10 includes the OLT 100, the ONUs 200-i (i=0 to m-1), optical fibers (300N, 300S, 310, and 320-i), optical branching/coupling units 410 and 420-i, and an optical switch 430. The optical branching/coupling units 410 and 420-i are optical splitters (power splitters), for example.

The OLT 100 is connected to the optical branching/coupling unit 410 via the trunk fiber 310. In the optical branching/coupling unit 410, the trunk fiber 310 is branched into a main trunk fiber 300N and a backup trunk fiber 300S. The loop path 300 is formed by connecting the main trunk fiber 300N and the backup trunk fiber 300S in a loop. The communication path constituted by the main trunk fiber 300N corresponds to the above-described normal path PN. On the other hand, the communication path constituted by the backup trunk fiber 300S corresponds to the above-described backup path PS.

The ONUs 200-$i$ are connected to the loop path 300 (main trunk fiber 300N) in parallel. More specifically, the optical branching/coupling units 420-$i$ are arranged in order on the main trunk fiber 300N. The ONUs 200-$i$ are respectively connected to the optical branching/coupling units 420-$i$ via branch fibers 320-$i$. Preferably, the branch fibers 320-$i$ have substantially the same length. Here, "substantially the same length" means that the lengths are the same, or that the variation in length is small enough to be ignored.

The optical branching/coupling unit 410 distributes downlink optical signals from the trunk fiber 310 to the main trunk fiber 300N and the backup trunk fiber 300S. The optical branching/coupling unit 410 also outputs uplink optical signals from the main trunk fiber 300N and the standby trunk fiber 300S to the trunk fiber 310.

The optical branching/coupling units 420-$i$ each distribute optical signals from the trunk fiber on one side to the trunk fiber and the branch fibers 320-$i$ on the other side. The optical branching/coupling units 420-$i$ each also distribute optical signals from the branch fibers 320-$i$ to the trunk fibers on both sides.

The optical switch 430 is provided on the main trunk fiber 300N and the standby trunk fiber 300S. The optical switch 430 enables/disables the normal path PN by allowing/blocking the passage of optical signals on the main trunk fiber 300N. Similarly, the optical switch 430 enables/disables the backup path PS by allowing/blocking the passage of optical signals on the backup trunk fiber 300S. The setting of this optical switch 430 is switched by the OLT 100.

Figure 14:
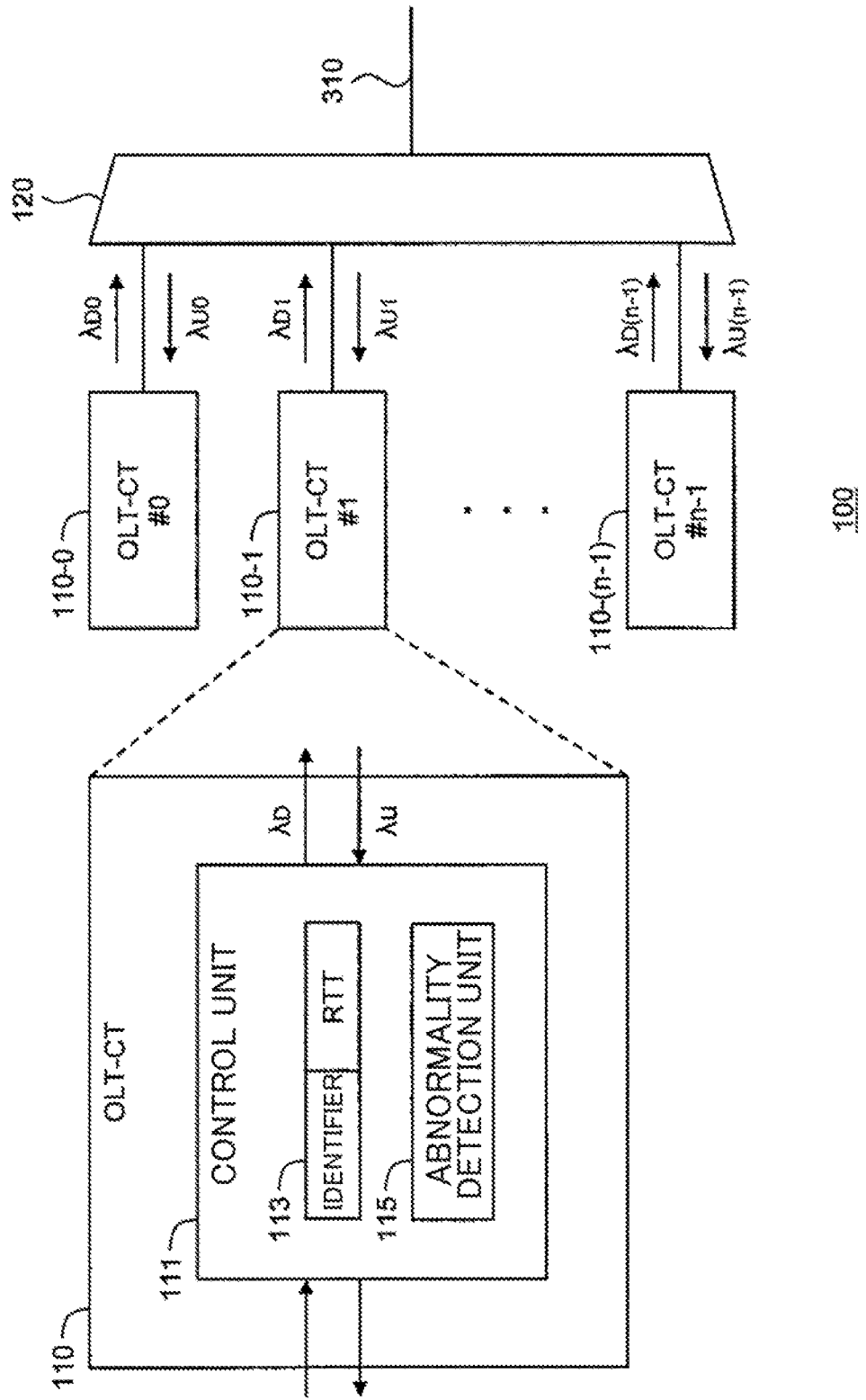
FIG. 14 is a conceptual diagram showing an example of the configuration of the master station device (OLT) in the optical communication system according to the embodiment of the present invention.

FIG. 14 is a conceptual diagram showing an example of the configuration of the OLT 100. The OLT 100 includes a plurality of channel termination devices 110-$x$ ($x$=0 to n−1) and a wavelength multiplexer/demultiplexer 120. Here, n is an integer greater than or equal to 2. The channel termination devices 110 are also called an OLT-CT (Channel Termination) or an OSU (Optical Subscriber Unit).

Different wavelengths are assigned to the channel termination devices 110-$x$. In other words, the channel termination devices 110-$x$ perform communication using optical signals that have different wavelengths. More specifically, the channel termination devices 110-$x$ each perform downlink communication using a downlink optical signal that has a wavelength $\lambda_{Dx}$, and perform uplink communication using an uplink optical signal that has a wavelength $\lambda_{Ux}$. The wavelength $\lambda_{Dx}$ and the wavelength $\lambda_{Ux}$ are different wavelengths.

The wavelength multiplexer/demultiplexer 120 is connected to each of the channel termination devices 110-$x$. The wavelength multiplexer/demultiplexer 120 combines the wavelength $\lambda_{Dx}$ downlink optical signals output from the channel termination devices 110-$x$ to generate a downlink WDM signal, and outputs the downlink WDM signal to the trunk fiber 310. The downlink WDM signal is distributed to each of the ONUs 200-$i$.

The ONUs 200-$i$ each have a variable wavelength and are assigned to one of the channel termination devices 110-$x$ (wavelength $\lambda_{Dx}$, $\lambda_{Ux}$). The ONUs 200-$i$ each extract the downlink optical signal that has the corresponding assigned wavelength $\lambda_{Dx}$ from the downlink WDM signal. Also, the ONUs 200-$i$ each transmit an uplink optical signal that has the corresponding assigned wavelength $\lambda_{Ux}$. The wavelength multiplexer/demultiplexer 120 demultiplexes uplink optical signals having various wavelengths from the trunk fiber 310, and outputs the uplink optical signals having the wavelengths to the channel termination devices 110-$x$. In this way, communication is performed between the channel termination devices 110-$x$ and the ONUs 200-$i$.

Note that it is assumed that the connection distances between the wavelength multiplexer/demultiplexer 120 and each of the channel termination devices 110-$x$ are substantially the same connection distance. Here, "substantially the same connection distance" means that the connection distances are the same, or that the variation in the connection distance is small enough to be ignored.

The channel termination device 110 includes a control unit 111. The control unit 111 performs registration processing (discovery) and registers one or more ONUs 200 that are to be communication partners. The control unit 111 also sets the QuietWindow and executes ranging processing. The control unit 111 includes a storage unit 113. The storage unit 113 stores the identifiers of the communication partner ONUs 200 in association with RTTs.

The control unit 111 also performs communication control processing for controlling communication with the ONUs 200. Specifically, the control unit 111 determines a transmission timing and a transmission amount for an uplink optical signal from each of the ONUs 200 based on the corresponding RTTs of the ONUs 200. The control unit 111 then generates transmission permission information (Grant) that includes an identifier, a transmission timing, and a transmission amount for each of the ONUS 200. The control unit 111 transmits the generated transmission permission information to each of the ONUS 200. The ONUS 200 each transmit an uplink optical signal in accordance with the transmission timing and the transmission amount indicated by the transmission permission information.

The control unit 111 further includes an abnormality detection unit 115. The abnormality detection unit 115 detects fiber disconnection in the normal path PN (main trunk fiber 300N). In other words, the abnormality detection unit 115 detects a disconnected ONU 200-$j$ that cannot perform communication via the normal path PN.

For example, after the above-described transmission permission information is transmitted, the abnormality detection unit 115 monitors the reception status of uplink optical signals from the transmission partner ONUS 200. If an uplink optical signal is not received from an ONU 200 within a certain period of time after the transmission permission information is transmitted, the abnormality detection unit 115 determines that the corresponding ONU 200 has become a disconnected ONU 200-$j$.

As another example, the abnormality detection unit 115 may determine that fiber disconnection has occurred if uplink optical signals from multiple ONUS 200 are interrupted at substantially the same time (within a certain period of time) and a DyingGasp signal has not been received. As yet another example, the abnormality detection unit 115 may determine that fiber disconnection has occurred if uplink optical signals from multiple ONUs 200 farther than a certain distance (RTT) are interrupted at substantially the same time (within a certain period of time). As still another example, the abnormality detection unit 115 may detect fiber disconnection by performing a test using an OTDR (Optical Time Domain Reflectometer).

The functionality of each of the channel termination devices 110 (control units 111) is realized by an optical transceiver that transmits and receives optical signals, a controller that controls the optical transceiver and performs various types of information processing, and the like. Typically, the controller includes a processor and memory. The functionality of the channel termination device 110 is realized by the processor executing a communication control program stored in the memory. The communication program may be recorded on a computer-readable recording medium. The controller may be realized with use of hardware such as an ASIC (Application Specific Integrated Circuit), a PLD (Programmable Logic Device), or an FPGA (Field Programmable Gate Array).

Figure 15:
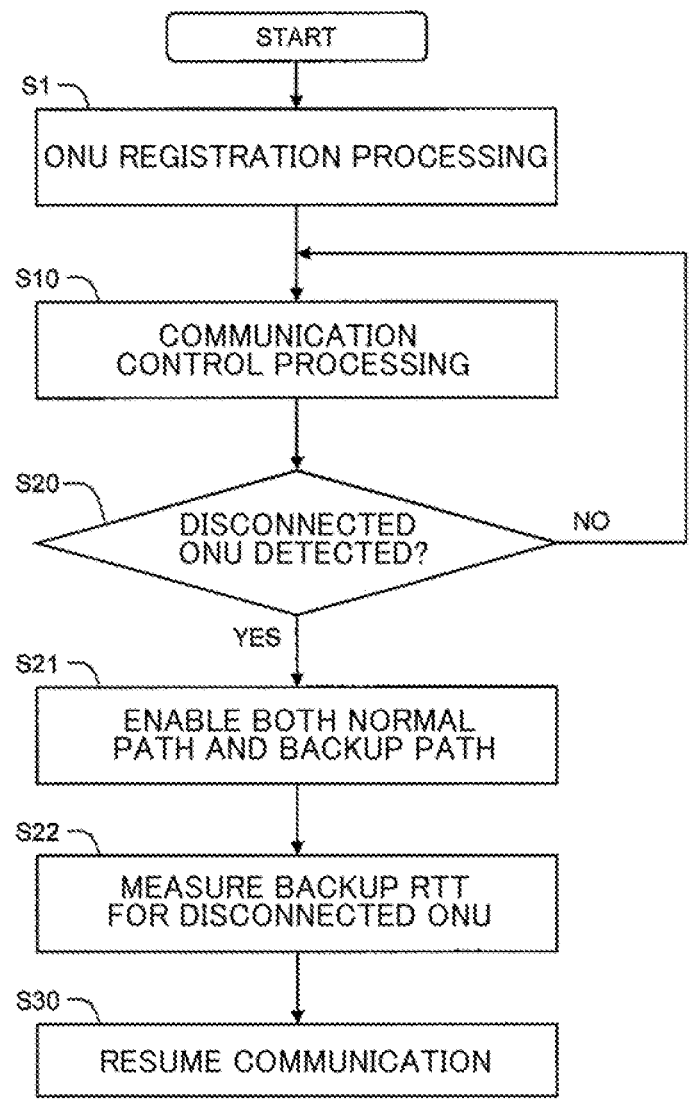
FIG. 15 is a flowchart showing an example of processing performed in the optical communication system according to the embodiment of the present invention.

FIG. 15 is a flowchart showing an example of processing performed by the optical communication system 10 according to the present embodiment.

In step S1, the OLT 100 enables the normal path PN and disables the backup path PS by operating the optical switch 430. Each channel termination device 110-x registers one or more ONUS 200 that are communication partners. At this time, the channel termination device 110-x assigns an identifier to each of the ONUS 200 and measures the normal path RTT for each of the ONUS 200. The normal path RTTs and the identifiers of the ONUS 200 are stored in the storage unit 113. In other words, each channel termination device 110-x holds the normal path RTTs and identifiers of the registered ONUS 200 in the storage unit 113.

Preparation for normal operation is thus complete. Thereafter, main signal communication starts.

In step S10, the channel termination devices 110-x each perform communication with the registered ONUS 200 via the normal path PN. At this time, the channel termination device 110-x executes communication control processing for the ONUS 20 based on the held normal path RTTs. Note that the channel termination devices 110-x may periodically measure and update the normal path RTTs.

In step S20, the channel termination devices 110-x (abnormality detection units 115) determine whether or not fiber disconnection has occurred in the normal path PN. In other words, the channel termination devices 110-x determine whether or not a disconnected ONU 200-j has appeared. If a disconnected ONU 200-j does not exist (No in step S20), the processing returns to step S10. On the other hand, if at least one disconnected ONU 200-j is detected (Yes in step S20), the processing proceeds to step S21. Note that even after a disconnected ONU 200-j is detected, the corresponding channel termination device 110-x holds the registration information (identifier and normal path RTT) for the disconnected ONU 200-j instead of deleting it.

In step S21, the OLT 100 enables the backup path PS in addition to the normal path PN by operating the optical switch 430.

In step S22, the channel termination device 110-z that is performing communication with the disconnected ONU 200-j switches the RTT for the disconnected ONU 200-j. Specifically, the channel termination device 110-z measures the backup path RTT (Tj_protect) for the disconnected ONU 200-j by setting the QuietWindow and executing ranging processing as described above. The channel termination device 110-z then switches the RTT for the disconnected ONU 200-j from the normal path RTT (Tj_normal) to the backup path RTT (Tj_protect). Note that given that the identifier of the disconnected ONU 200-j does not change, the identifier does not need to be updated.

In step S30, the channel termination device 110-z resumes communication by performing communication with the disconnected ONU 200-j via the backup path PS. More specifically, the channel termination device 110-z resumes communication control processing for the disconnected ONU 200-j based on the backup path RTT that was calculated in step S22.

5. OTHER REMARKS

The optical communication system 10 according to the present embodiment is not limited to being a PON system. The technique according to the present embodiment can be applied to any optical communication system that has a loop path 300 and executes communication control processing based on RTT.

The optical communication system 10 according to the present embodiment is applicable to, for example, a mobile fronthaul (MFH) in the case where a mobile communication area is deployed linearly or in a plane.

REFERENCE SIGNS LIST

10 Optical communication system
100 OLT (master station device)
110 Channel termination device
111 Control unit
113 Storage unit
115 Abnormality detection unit
120 Wavelength multiplexer/demultiplexer
200 ONU (slave station device)
200-j Disconnected ONU
300 Loop path
300N Main trunk fiber
300S Backup trunk fiber
310 Trunk fiber
320 Branch fiber
410 Optical branching/coupling unit
420 Optical branching/coupling unit
430 Optical switch
PN Normal path
PS Backup path

The invention claimed is:

1. An optical communication system comprising:
a plurality of slave station devices that are connected to a loop path in parallel; and
a master station device that is connected to the loop path and configured to perform communication with each of the slave station devices,
wherein communication paths between the master station device and each of the slave station devices include:
a normal path that extends along the loop path from the master station device to each of the slave station devices in a first direction, and
a backup path that extends along the loop path from the master station device to each of the slave station devices in a second direction that is opposite to the first direction,
the master station device is configured to execute:
ranging processing for setting a QuietWindow and measuring an RTT (Round Trip Time) between the master station device and each of the slave station devices, and
communication control processing for controlling communication with the slave station devices based on the RTTs,
a normal path RTT is the RTT in a case of communication performed via the normal path,
a backup path RTT is the RTT in a case of communication performed via the backup path,
a disconnected slave station device is a slave station device that cannot perform communication via the normal path, among the plurality of slave station devices, if the disconnected slave station device does not exist, the master station device executes the communication control processing with respect to the slave station devices based on the normal path RTTs, if the disconnected slave station device is detected, the master station device executes the ranging processing and measures the backup path RTT for the disconnected slave station device, and resumes the communication control processing with respect to the disconnected slave station device based on the backup path RTT, a first slave station device is a disconnected slave station device having a first normal path RTT as the normal path RTT, a second slave station device is a disconnected slave station device having a second normal path RTT as the normal path RTT, the second normal path RTT being longer than the first normal path RTT, a first backup path RTT is the backup path RTT between the master station device and the first slave station device, a second backup path RTT is the backup path RTT between the master station device and the second slave station device, and in the ranging processing for measuring the backup path RTT, based on a fact that the first backup path RTT is longer than the second backup path RTT, and that the second backup path RTT is shorter than the first backup path RTT, the master station device limits the QuietWindow to a size smaller than a predetermined maximum size.

2. The optical communication system according to claim 1, wherein in the ranging processing for measuring the backup path RTT, the master station device sets the size of the QuietWindow based on an envisioned maximum value and an assumed minimum value of the backup path RTT, the master station device sets the envisioned maximum value of the first backup path RTT to a value less than or equal to a predetermined maximum value, and based on a fact that the second backup path RTT is shorter than the first backup path RTT, the master station device sets the envisioned maximum value of the second backup path RTT to a value that is smaller than the envisioned maximum value of the first backup path RTT.

3. The optical communication system according to claim 2, wherein after measuring the first backup path RTT, the master station device sets the envisioned maximum value of the second backup path RTT to a value that is less than or equal to the measured first backup path RTT.

4. The optical communication system according to claim 2, wherein a third slave station device is a slave station device having a third normal path RTT as the normal path RTT, the third normal path RTT being smallest among the plurality of slave station devices, and the master station device sets the envisioned maximum value of the second backup path RTT smaller than the predetermined maximum value by an amount corresponding to a difference between the second normal path RTT and the third normal path RTT.

5. The optical communication system according to claim 1, wherein in the ranging processing for measuring the backup path RTT, the master station device sets the size of the QuietWindow based on an envisioned maximum value and an assumed minimum value of the backup path RTT, and based on a fact that the first backup path RTT is longer than the second backup path RTT, the master station device sets the envisioned minimum value of the first backup path RTT to a value that is larger than a predetermined minimum value.

6. The optical communication system according to claim 5, wherein a fourth slave station device is a slave station device having a fourth normal path RTT as the normal path RTT, the fourth normal path RTT being largest among the plurality of slave station devices, and the master station device sets the envisioned minimum value of the first backup path RTT larger than the predetermined minimum value by an amount corresponding to a difference between the fourth normal path RTT and the first normal path RTT.

7. The optical communication system according to claim 1, wherein an RTT difference is a difference between the second normal path RTT and the first normal path RTT, and after measuring the first backup path RTT, the master station device estimates a range of the second backup path RTT based on the measured backup path RTT and the RTT difference, sets the QuietWindow in accordance with the estimated range of the second backup path RTT, and measures the second backup path RTT.

8. A master station device that performs communication with each of a plurality of slave station devices in an optical communication system, wherein the slave station devices are connected to a loop path in parallel, communication paths between the master station device and each of the slave station devices include:
a normal path that extends along the loop path from the master station device to each of the slave station devices in a first direction, and
a backup path that extends along the loop path from the master station device to each of the slave station devices in a second direction that is opposite to the first direction, the master station device is configured to execute:
ranging processing for setting a QuietWindow and measuring an RTT (Round Trip Time) between the master station device and each of the slave station devices, and
communication control processing for controlling communication with the slave station devices based on the RTTs, a normal path RTT is the RTT in a case of communication performed via the normal path, a backup path RTT is the RTT in a case of communication performed via the backup path, a disconnected slave station device is a slave station device that cannot perform communication via the normal path, among the plurality of slave station devices, if the disconnected slave station device does not exist, the master station device executes the communication control processing with respect to the slave station devices based on the normal path RTTs, if the disconnected slave station device is detected, the master station device executes the ranging processing and measures the backup path RTT for the disconnected slave station device, and resumes the communication control processing with respect to the disconnected slave station device based on the backup path RTT, a first slave station device is a disconnected slave station device having a first normal path RTT as the normal path RTT, a second slave station device is a disconnected slave station device having a second normal path RTT as the normal path RTT, the second normal path RTT being longer than the first normal path RTT, a first backup path RTT is the backup path RTT between the master station device and the first slave station device, a second backup path RTT is the backup path RTT between the master station device and the second slave station device, and in the ranging processing for measuring the backup path RTT, based on a fact that the first backup path RTT is longer than the second backup path RTT, and that the second backup path RTT is shorter than the first backup path RTT, the master station device limits the Quiet-Window to a size smaller than a predetermined maximum size.

* * * * *